(12) United States Patent
Biernacki

(10) Patent No.: US 12,079,247 B2
(45) Date of Patent: *Sep. 3, 2024

(54) PROCESSOR-IMPLEMENTED SYSTEMS AND METHODS FOR SYNTHESIZED DOCUMENT CLUSTERING

(71) Applicant: Ontologics, Inc., Scottsdale, AZ (US)

(72) Inventor: John V. Biernacki, Columbia Station, OH (US)

(73) Assignee: Ontologics, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/052,488

(22) Filed: Nov. 3, 2022

(65) Prior Publication Data

US 2023/0089988 A1 Mar. 23, 2023

Related U.S. Application Data

(63) Continuation of application No. 17/247,335, filed on Dec. 8, 2020, now Pat. No. 11,494,419.

(51) Int. Cl.
| | |
|---|---|
| *G06F 7/02* | (2006.01) |
| *G06F 16/00* | (2019.01) |
| *G06F 16/22* | (2019.01) |
| *G06F 16/28* | (2019.01) |
| *G06F 16/93* | (2019.01) |
| *G06F 16/31* | (2019.01) |
| *G06F 16/36* | (2019.01) |

(52) U.S. Cl.
CPC ........ *G06F 16/285* (2019.01); *G06F 16/2246* (2019.01); *G06F 16/93* (2019.01); *G06F 16/322* (2019.01); *G06F 16/367* (2019.01)

(58) Field of Classification Search
CPC .... G06F 16/285; G06F 16/93; G06F 16/2246; G06F 16/322; G06F 16/367
See application file for complete search history.

(56) References Cited

U.S. PATENT DOCUMENTS

| | | |
|---|---|---|
| 7,024,408 B2 | 4/2006 | Dehlinger et al. |
| 7,099,849 B1 | 8/2006 | Reeder et al. |
| 7,657,476 B2 | 2/2010 | Barney |

(Continued)

FOREIGN PATENT DOCUMENTS

| | | |
|---|---|---|
| EP | 1860578 A1 | 11/2007 |
| EP | 2178002 A3 | 7/2010 |

OTHER PUBLICATIONS

Kyriakopoulou, Antonia, "Text Classification Aided by Clustering: a Literature Review," from Tools in Artificial Intelligence, , downloaded from https://www.intechopen.com/chapters/5290, Aug. 1, 2008. (Year: 2008).*

P. Ganesan et al., "Exploiting hierarchical domain structure to compute similarity", ACM Transactions on Information Systems, vol. 21, Issue 1, pp. 64-93 (2003).

(Continued)

*Primary Examiner* — Bruce M Moser

(74) *Attorney, Agent, or Firm* — LKGLOBAL | Lorenz & Kopf LLP

(57) ABSTRACT

Processor-implemented systems and methods are provided for generating clusters of technical documents. A method includes analyzing degrees of similarity among the technical documents using a hierarchical taxonomy code similarity model and a text clustering model. Clusters of the technical documents are generated based upon the analyzed degrees of similarity from the models.

12 Claims, 28 Drawing Sheets

(56) References Cited

U.S. PATENT DOCUMENTS

| | | | |
|---|---|---|---|
| 7,716,581 | B2 | 5/2010 | Tran |
| 7,797,253 | B2 | 9/2010 | Sherwood et al. |
| 8,095,581 | B2 | 1/2012 | Stobbs et al. |
| 8,332,740 | B2 | 12/2012 | Graham |
| 9,020,271 | B2 | 4/2015 | Deolalikar et al. |
| 9,367,814 | B1 | 6/2016 | Lewis et al. |
| 9,710,457 | B2 | 7/2017 | Stobbs et al. |
| 10,565,233 | B2 | 2/2020 | Deng et al. |
| 11,023,774 | B2 | 6/2021 | Nefedov |
| 2003/0172020 | A1 | 9/2003 | Davies et al. |
| 2010/0312725 | A1 | 12/2010 | Privault et al. |
| 2013/0013295 | A1 | 1/2013 | Lee |
| 2015/0310000 | A1 | 10/2015 | Schijvenaars et al. |
| 2016/0012019 | A1 | 1/2016 | Bagwell et al. |
| 2016/0147891 | A1* | 5/2016 | Chhichhia ............. G06F 16/986 707/734 |
| 2018/0173699 | A1* | 6/2018 | Tacchi ................. G06F 16/358 |

OTHER PUBLICATIONS

D. Eisinger et al., "Automated patent categorization and guided patent search using IPC as inspired by MeSH and PubMed", Journal of Biomedical Semantics 2013, 4(Suppl 1):S3 (2013).

A. Giachanou et al., "Multilayer source selection as a tool for supporting patent search and classification", Inf. Retrieval J. 18:559-585 (2015).

L. Leydesdorf et al., "Mapping patent classifications: portfolio and statistical analysis, and the comparison of strengths and weaknesses", Scientometrics 112:1573-1591 (2017).

S. Sohangir et al., "Improved sqrt-cosine similarity measurement", J Big Data 4:25 (2017.

T. Tran et al., "Supervised approaches to assign Cooperative Patent Classification (CPC) codes to patents", In Proceedings of The Fifth International Conference on Mining Intelligence and Knowledge Exploration (MIKE 2017).

A. Abood et al., "Automated patent landscaping", Artif. Intell. Law 26, 103-125 (2018).

* cited by examiner

| Tier | Cluster_Number | Cluster_Name | Rule_Number | Cluster_Rule | Weight |
|---|---|---|---|---|---|
| Tier_1 | 1 | Robotic Controllers | 1.1.1 | (Keywords("robotic" in proximity with "control*") in title or abstract) and (in pre-specified list of taxonomy searching codes related to robotic controllers) and (in list of selected company names) | 100 |
| Tier_1 | 1 | Robotic Controllers | 1.1.2 | (Keywords("robotic" in proximity with "controller" and "neural network")) | 90 |
| Tier_1 | 1 | Robotic Controllers | 1.1.2 | Satisfies(Rule 2.1.1 and Rule 2.1.2) | 85 |
| Tier_1 | 2 | Robotic Polymer Materials | 1.2.1 | Keywords("robotic" in proximity with "polymer" and "material") and (in group of list of patents provided by customer) | 95 |
| Tier_1 | 3 | Robotic Surgery | 1.3.1 | Keywords("robotic" in proximity with "surgery") and (in group of list of company names) | 90 |
| ... | ... | ... | ... | ... | ... |
| Tier_2 | 1 | Robotic Controllers | 2.1.1 | (in list of companies that manufacture robotic controllers) | 50 |
| Tier_2 | 1 | Robotic Controllers | 2.1.2 | (Keywords("robotic" and "controller") anywhere in text) and (in pre-specified list of taxonomy searching codes related to robotic controllers) | 60 |
| Tier_2 | 2 | Robotic Polymer Materials | 2.2.1 | ... | ... |
| Tier_2 | 3 | Robotic Surgery | 2.3.1 | ... | ... |
| ... | ... | ... | ... | ... | ... |
| Tier_5 | 1 | Robotic Controllers | 5.1.1 | (Keywords("robotic" and "controller") anywhere in specification | 20 |
| Tier_5 | 2 | Robotic Polymer Materials | 5.2.1 | ... | ... |
| Tier_5 | 3 | Robotic Surgery | 5.3.1 | ... | ... |
| ... | ... | ... | ... | ... | ... |

FIG. 17

|     | D1  | D2  | D3  | D4  | D5  | D6  | D7  | D8  | D9  | D10 | D11 | D12 | D13 | D14 |     |
| --- | --- | --- | --- | --- | --- | --- | --- | --- | --- | --- | --- | --- | --- | --- | --- |
| D1  | 100 | 4   | 35  | 35  | 35  | 35  | 35  | 35  | 15  | 13  | 15  | 30  | 30  | 78  |     |
| D2  | 3   | 100 | 0   | 0   | 0   | 0   | 0   | 0   | 3   | 0   | 3   | 3   | 0   | 3   |     |
| D3  | 35  | 0   | 100 | 100 | 100 | 100 | 100 | 58  | 0   | 25  | 15  | 35  | 80  | 35  |     |
| D4  | 35  | 0   | 100 | 100 | 100 | 100 | 100 | 58  | 0   | 25  | 15  | 35  | 80  | 35  |     |
| D5  | 35  | 0   | 100 | 100 | 100 | 100 | 100 | 58  | 0   | 25  | 15  | 35  | 80  | 35  |     |
| D6  | 35  | 0   | 100 | 100 | 100 | 100 | 100 | 58  | 0   | 25  | 15  | 35  | 80  | 35  |     |
| D7  | 15  | 4   | 62  | 62  | 62  | 62  | 62  | 100 | 0   | 13  | 15  | 26  | 26  | 26  |     |
| D8  | 8   | 0   | 0   | 0   | 0   | 0   | 0   | 0   | 100 | 0   | 56  | 88  | 0   | 15  |     |
| D9  | 15  | 3   | 19  | 19  | 19  | 19  | 19  | 8   | 52  | 100 | 8   | 8   | 8   | 8   |     |
| D10 | 30  | 4   | 15  | 15  | 15  | 15  | 15  | 15  | 84  | 9   | 80  | 65  | 15  | 15  |     |
| D11 | 35  | 0   | 27  | 27  | 27  | 27  | 27  | 24  | 0   | 13  | 15  | 100 | 27  | 30  |     |
| D12 | 78  | 3   | 80  | 80  | 80  | 80  | 80  | 24  | 12  | 9   | 15  | 30  | 27  | 100 |     |

FIG. 23

| | D1 | D2 | D3 | D4 | D5 | D6 | D7 | D8 | D9 | D10 | D11 | D12 | D13 | D14 | ... |
|---|---|---|---|---|---|---|---|---|---|---|---|---|---|---|---|
| D14 | 22 | 97 | 65 | 65 | 65 | 65 | 65 | 74 | 85 | 92 | 85 | 70 | 65 | 0 | ... |
| D13 | 70 | 100 | 20 | 20 | 20 | 20 | 20 | 74 | 100 | 92 | 85 | 73 | 0 | 73 | |
| D12 | 70 | 97 | 65 | 65 | 65 | 65 | 65 | 74 | 12 | 92 | 85 | 0 | 65 | 70 | |
| D11 | 85 | 97 | 85 | 85 | 85 | 85 | 85 | 44 | 92 | 0 | 20 | 85 | 85 | | |
| D10 | 87 | 100 | 75 | 75 | 75 | 75 | 75 | 87 | 100 | 0 | 87 | 91 | 87 | 91 | |
| D9 | 85 | 97 | 100 | 100 | 100 | 100 | 100 | 0 | 100 | 48 | 16 | 100 | 88 | | |
| D8 | 65 | 100 | 42 | 42 | 42 | 42 | 0 | 100 | 92 | 85 | 76 | 68 | 76 | | ... |
| D7 | 65 | 100 | 0 | 0 | 0 | 0 | 38 | 100 | 81 | 85 | 73 | 20 | 73 | | |
| D6 | 65 | 100 | 0 | 0 | 0 | 0 | 38 | 100 | 81 | 85 | 73 | 20 | 73 | | |
| D5 | 65 | 100 | 0 | 0 | 0 | 0 | 38 | 100 | 81 | 85 | 73 | 20 | 73 | | |
| D4 | 65 | 100 | 0 | 0 | 0 | 0 | 38 | 100 | 81 | 85 | 73 | 20 | 73 | | |
| D3 | 65 | 100 | 0 | 0 | 0 | 0 | 38 | 100 | 81 | 85 | 73 | 20 | 73 | | |
| D2 | 96 | 0 | 100 | 100 | 100 | 100 | 96 | 100 | 97 | 96 | 100 | 97 | | | |
| D1 | 0 | 97 | 65 | 65 | 65 | 65 | 65 | 85 | 92 | 85 | 70 | 65 | 22 | | |

PROCESSOR-IMPLEMENTED SYSTEMS AND METHODS FOR SYNTHESIZED DOCUMENT CLUSTERING

CROSS-REFERENCE TO RELATED APPLICATION

This application is a continuation of U.S. patent application Ser. No. 17/247,335, filed Dec. 8, 2020, the entire content of which is incorporated by reference herein.

TECHNICAL FIELD

This disclosure relates to computer systems for processing documents and more particularly to computer systems for clustering documents.

BACKGROUND

Document clustering algorithms attempt to group documents together based on their how well they match in content. Documents that are relevant to a certain topic will typically be allocated to the same cluster. Documents allocated to different cluster, however, should have different characteristics.

Clustering can involve large volumes of documents, such as text files, e-mails, journal articles, etc. Companies may try to use a text analysis clustering approach that analyzes the textual content of the volumes of data. A text clustering process can be very time consuming to implement properly because of the unstructured nature of the data and frequently provides poor results with clusters having an unacceptable number of unrelated documents.

Accordingly, it would be desirable to provide a computer system for organizing electronic documents with an improved clustering or grouping approach.

SUMMARY

In accordance with the teachings provided herein, systems, methods, apparatuses, non-transitory computer-readable medium for operation upon data processing devices are provided for generating clusters of technical documents. For example, a method can include analyzing degree of similarity among the technical documents using a hierarchical taxonomy code similarity model and a text clustering model. Clusters of the technical documents are generated based upon the analyzed degrees of similarity from the models.

As another example, processor-implemented methods, systems, and non-transitory computer-readable medium are provided for restructuring clusters of technical documents that are directed to specific technical areas and includes receiving, by one or more data processors, the technical documents which are associated with multiple taxonomy codes for describing different technical subject matter areas of the technical documents. The taxonomy codes are associated with a hierarchical technical subject matter taxonomy which establishes a network of parent-child technical subject matter code relationships for describing technical subject matter at different levels of detail. Degrees of similarity among the technical subject matter areas of the technical documents are determined through a hierarchical taxonomy code similarity model and a text clustering model. The hierarchical taxonomy code similarity model determines the degrees of similarity among the technical documents' hierarchical taxonomy codes based upon the technical documents' network of parent-child subject matter code relationships within the hierarchical technical subject matter taxonomy. The text clustering model determines the degrees of similarity among the technical documents by generating a first set of clusters that cluster together the technical documents of similar technical subject matter areas. At least a portion of the first set of clusters of the technical documents is restructured into a second set of clusters based upon the degrees of similarity from the hierarchical taxonomy code similarity model and the determined degrees of similarity from the text clustering model.

As yet another example, a processor-implemented method is provided for restructuring clusters of technical documents that are directed to specific technical areas and includes receiving, by one or more data processors, technical documents which are associated with hierarchical taxonomy codes for describing the technical areas of the technical documents. Degrees of similarity are determined among the technical areas of the technical documents through a hierarchical taxonomy code similarity model and a text clustering model. The hierarchical taxonomy code similarity model determines degrees of similarity among the technical document's hierarchical taxonomy codes that indicate in a multi-layer hierarchical manner the technical areas of the technical documents. The text clustering model generates a first set of clusters that cluster the technical documents in similar technical areas. At least a portion of the first set of clusters of the technical documents are restructured into a second set of clusters based upon the determined degrees of similarity of the hierarchical taxonomy code similarity model and the technical documents identified as similar by the text clustering model.

As another example, a non-transitory computer-readable medium has stored there on instructions that, when executed, cause one or more processors to: receive, by one or more data processors, technical documents which are associated with hierarchical taxonomy codes for describing the technical areas of the technical documents; determine, by the one or more data processors, degrees of similarity among the technical areas of the technical documents through a hierarchical taxonomy code similarity model and a text clustering model; wherein the hierarchical taxonomy code similarity model determines degrees of similarity among the technical document's hierarchical taxonomy codes that indicate in a multi-layer hierarchical manner the technical areas of the technical documents; wherein the text clustering model generates a first set of clusters that cluster the technical documents in similar technical areas; and restructure, by the one or more data processors, at least a portion of the first set of clusters of the technical documents into a second set of clusters based upon the determined degrees of similarity of the hierarchical taxonomy code similarity model and the technical documents identified as similar by the text clustering model.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 17 is a table chart depicting tiered cluster rules.

FIGS. 23-25 are charts illustrating data transformations involved in cluster synthesis operations.

DETAILED DESCRIPTION

Figure 1:
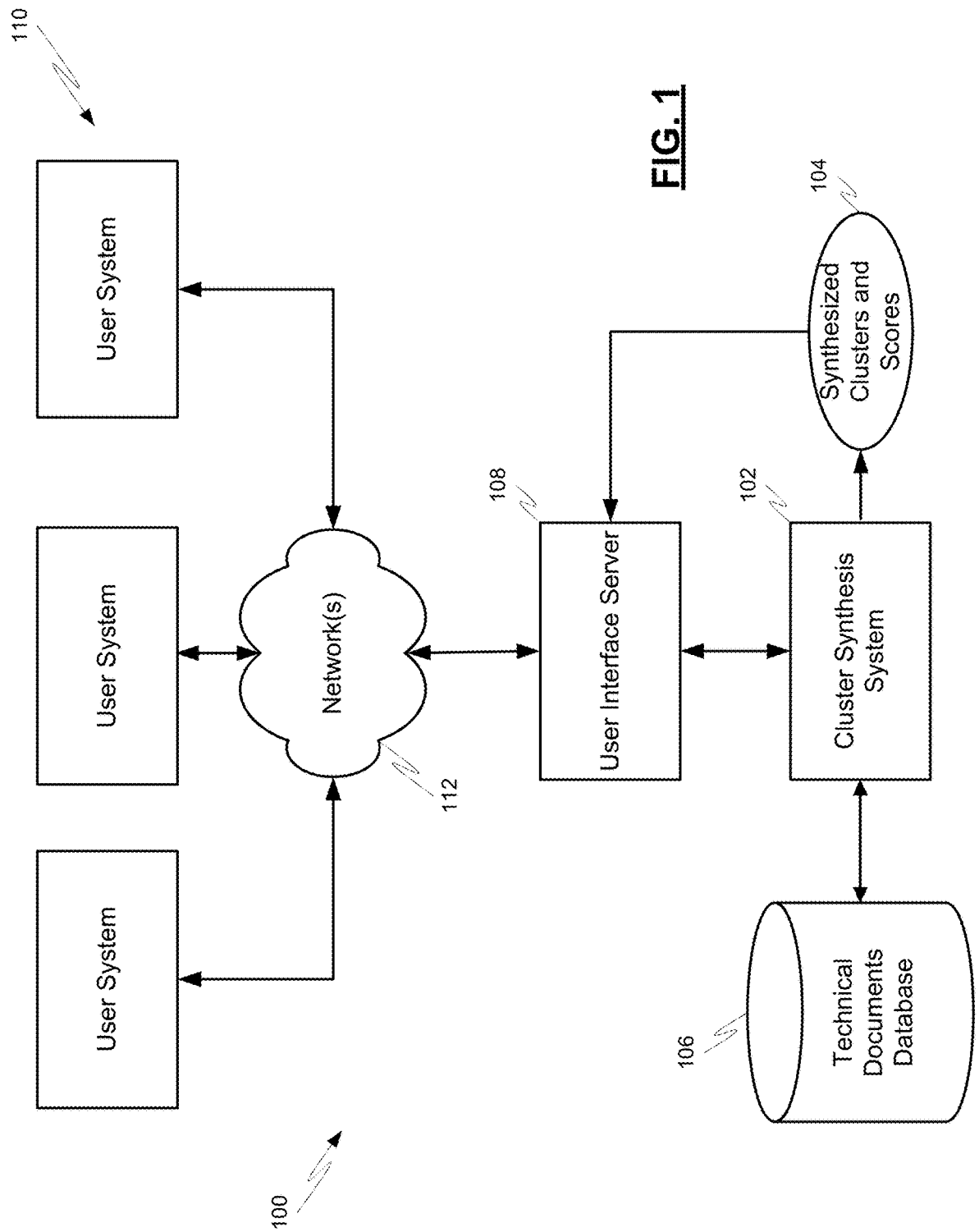
FIG. 1 is a block diagram depicting a system for clustering documents using multiple different models.

FIG. 1 and the following discussion are intended to provide a brief, general description of non-limiting examples of example environments and processing in which the example embodiments described herein may be implemented.

FIG. 1 depicts a system at 100 for clustering documents using multiple different approaches to generate an overall set of document clusters. A cluster synthesis system 102 accesses documents that are technical in subject matter and processes them to generate at 104 a synthesized set of clusters through the different clustering approaches. A synthesized set of clusters 104 contains more accurate groupings of technical documents based on the measured degrees of similarity between technical documents. The cluster synthesis system 102 also generates scores at 104 to indicate how similar a document is relative to other documents.

The technical documents to be processed by the cluster synthesis system 102 can be related to a single technical field (with subcategories) or to multiple technical fields (e.g., medical field, computer networking field, polymer chemistry field, etc.). The technical documents may be stored in a database 106 that is located locally or remotely relative to the cluster synthesis system 102. The technical documents may be stored in a structured or unstructured way within the database 106. For example, the textual content and metadata of the technical documents can be stored as structured data within fields of a relational database. Textual content can include The cluster synthesis system 102 communicates the document clustering results through a user interface server 108 to user systems 110 over one or more data communication networks 112. The user systems 110 can view or further process the document clustering results through their own computer systems. Viewing of the document clustering results can be visually shown on displays or in reports generated by the cluster synthesis system 102. The user systems 110 may wish to further process the results such as by determining the number of companies associated with the technical documents in a specific cluster.

The data communication network(s) 112 may be any digital or other communications network capable of transmitting messages or data between devices, systems, or components. In certain embodiments, the data communication network(s) 112 includes a packet switched network that facilitates packet-based data communication, addressing, and data routing. The packet switched network could be, for example, a wide area network, the Internet, or the like. In various embodiments, the data communication network(s) 112 includes any number of public or private data connections, links or network connections supporting any number of communications protocols. The data communication network(s) 112 may include the Internet, for example, or any other network based upon TCP/IP or other conventional protocols. In various embodiments, the data communication network(s) 112 could also incorporate wireless and/or wired telephone network, such as a cellular communications network for communicating with mobile phones, personal digital assistants, and/or the like. The data communication network(s) 112 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein. It should also be understood that in certain embodiments the document clustering results from the cluster synthesis system 102 may be viewed and further processed on the same server on which the cluster synthesis system 102 operates.

Figure 2:
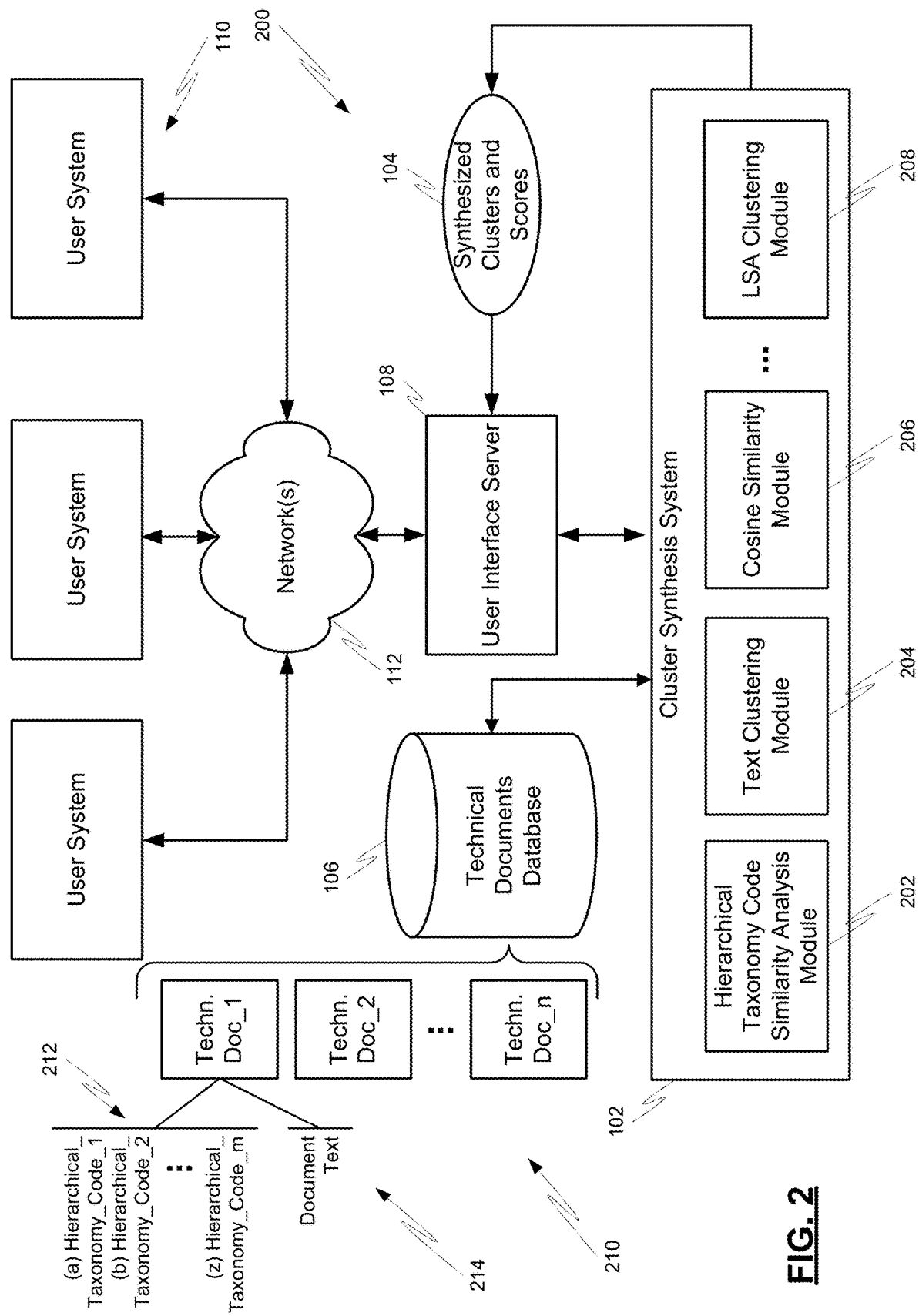
FIG. 2 is a block diagram depicting clustering and document similarity models generating synthesized clusters and scores.

FIG. 2 depicts at 200 examples of clustering models and document similarity models used within the cluster synthesis system 102. Examples include a hierarchical taxonomy code similarity analysis module 202, a text clustering module 204, a cosine similarity module 206, and a latent semantic analysis (LSA) clustering module, etc. The models can look at different content or characteristics of the technical documents 210 to generate their respective clustering analysis or document similarity analysis.

A hierarchical taxonomy code similarity analysis module 202 examines the hierarchical taxonomy codes 212 associated with the technical documents 210. Module 202 determines the degree of similarity between the hierarchies of two technical documents by examining the hierarchies' specific placement within the overall hierarchical taxonomy.

The overall hierarchical taxonomy is a hierarchical arrangement of technical categories. Codes are associated with the technical categories as shorthand indicators to the categories. The highest levels within the hierarchy contain more general technical categories while lower levels contain more detailed technical categories. Moving up the hierarchy expands the category or concept. Moving down the hierarchy refines the category or concept. In this way, the hierarchical taxonomy operates as a tree-shaped structure for showing the relationships among items within the hierarchy. A hierarchical taxonomy could be configured such that a code within the hierarchy may not indicate its parent nodes or child nodes. In such a situation, the system accesses a The hierarchical taxonomy codes can be of many different types provided the codes describe the technical subject matter of the documents 210. The hierarchical taxonomy codes can be based upon one or more of the following: MEDLINE tree number classification system for pharma, drug, or medical technical documents; SITC codes for industry products or services; patent classification codes for patents, published patent applications, and technical articles that have been associated with patent classification codes; etc. Codes can be of many different types, such as symbols, words, etc.

In addition to the hierarchical taxonomy code similarity analysis module 202, other models within the model collection, such as the text clustering module 204, cosine similarity module 206, and LSA clustering module 208 examine different aspects of the technical documents 210. For example, models 204, 206, and 208 examine the document text 214 of the technical documents 210. Models 204, 206, and 208 may examine the entire text or certain parts, such as the abstract, of the technical documents 210.

Each model in the model collection has advantages and disadvantages. In view of this, an embodiment includes the cluster synthesis system 102 optimizing the results from the models to generate the synthesized clusters and scores 104. The optimization and overall effectiveness of the multiple model approach rely on each model having relative independence from the other models. This can be interpreted as meaning that a model is skillful in a different way from the other models in the collection of models. The collection of models approach can limit the worst case of predictions by reducing the variance of the predictions.

A model in the model collection can be configured to generate a document similarity a range of scores, such as 0-100. A score of 100 indicates two documents are highly related. A score of 0 indicates that the two documents are not related relative to the criteria used by the model's technique (e.g., text clustering similarity, hierarchical taxonomy similarity, etc.). The output document similarity score from each modeling technique (as to whether two documents are related) is processed to yield an overall document similarity score for the two documents. The overall relatedness score is used by the cluster synthesis system 102 to form synthesized clusters at 104 where similar documents are clustered together. It should be understood that different quantitative values or ranges of values other than 0-100 can be used by the models to indicate technical document similarity. Additionally, the output could supplement or replace the quantitative values with qualitative values such as "highly related," "somewhat related," "not related," etc.

Figure 3:
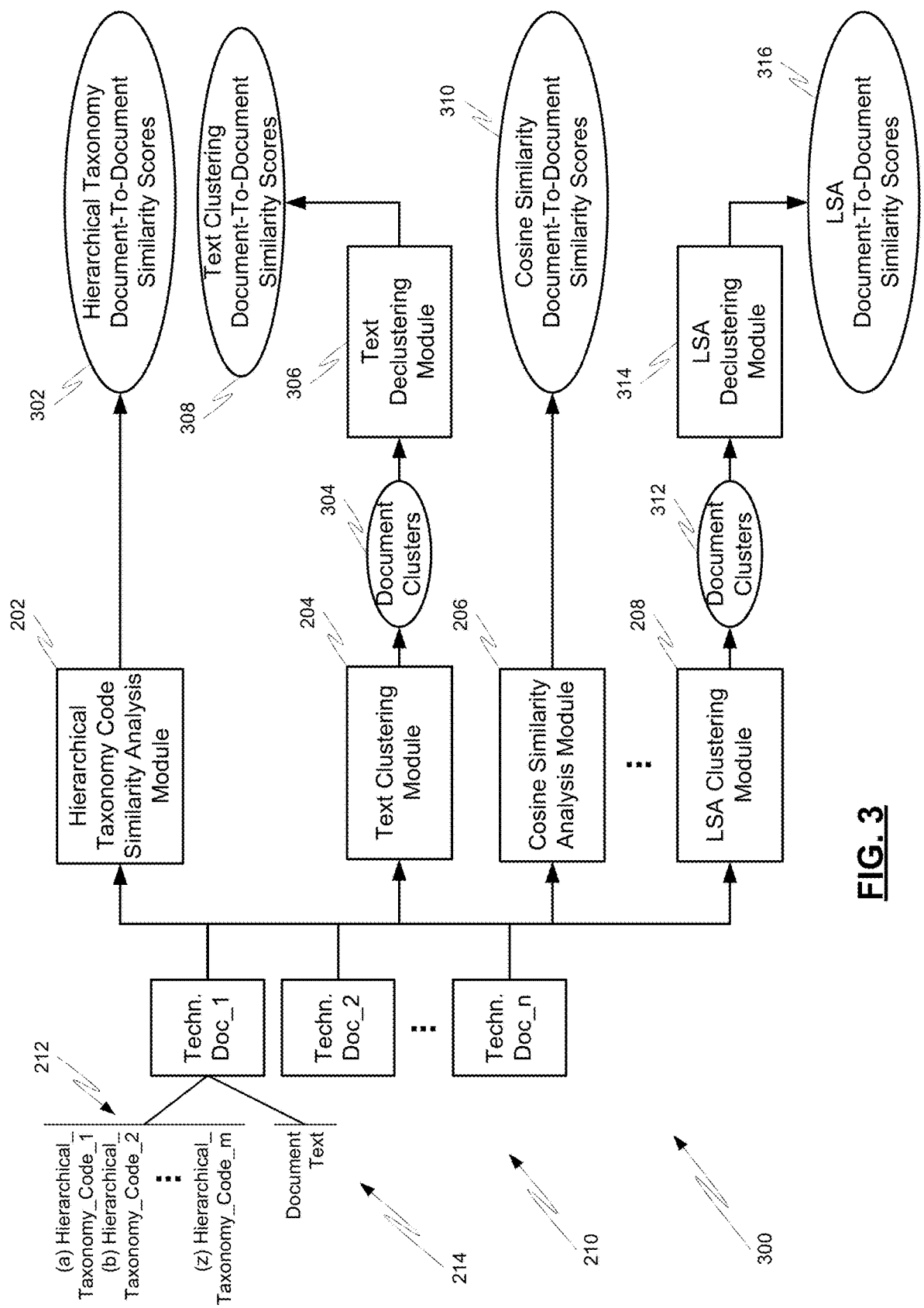
FIG. 3 is a block diagram depicting a collection of models generating a plurality of document-to-document similarity scores.

FIG. 3 depicts at 300 the model collection generating individual document-to-document similarity scores. More specifically, the hierarchical taxonomy code similarity analysis module 202 examines the hierarchical taxonomy codes associated with each of the technical documents 210 and determines the overall degree of similarity between the hierarchical taxonomies. The overall degrees of similarities for each combination of documents is provided as hierarchical taxonomy document-to-document similarity scores 302.

The text clustering module 204 using a k-means clustering algorithm processes document text 214 of the technical documents 210 to generate clusters of documents 304. A text declustering module 306 transforms the document clusters 304 into a data set 308 where each document in a cluster is separately paired with all other documents in the cluster and assigned a text clustering document-to-document similarity score. Pair-wise documents that appeared in the same cluster receive a non-zero similarity score. The similarity score for such pair-wise documents may be set at 100 or a lower value depending on how well the text clustering module 204 indicates the clustering process performed. Performance evaluation can include many different techniques, such as determining whether an optimal number of clusters (k) is optimal (e.g., using the pre-established elbow technique), determining the number of false positives in a cluster (e.g., see I. Sharma et al., "Document Clustering: How to Measure Quality of Clusters in Absence of Ground Truth," IJCST Vol. 9, Issue 2, April-June 2018, which is hereby incorporated by reference for all purposes), etc. A manual review can be used alone or to supplement the clustering performance review by text clustering module 204. After review, the similarity score for one or more clusters can be lowered to reflect where clustering was not accurate (e.g., a significant number of technical documents were clustered with relatively unrelated technical documents).

The cosine similarity analysis module 206 examines the document text 214 of the technical documents 210 by creating vectors that indicate the importance of certain words within a technical document. After vector formation, the cosine similarity analysis module 206 measures the similarity between two vectors of an inner product space. It is measured by the cosine of the angle between two vectors and determines whether two vectors are pointing in approximately the same direction. Based upon this measurement, module 206 can generate a similarity score 310 (e.g., within a range of zero (no similarity) to 1 (most similar)) that indicates the degree of similarity between two technical documents. Module 206 performs the cosine similarity analysis for each combination of technical documents so that each document combination receives a similarity score.

The LSA clustering module 208 using a singular value decomposition algorithm to process document text 214. The processing generates topics and a list of the technical documents 210 that are associated with the topics. The set of technical documents that are associated with the same topic(s) are placed in the same cluster. LSA clustering module 208 generates document clusters 312. A text declustering module 314 transforms the document clusters 312 into a data set 316 where each document in a cluster is separately paired with all other documents in the cluster and assigned an LSA document-to-document similarity score. Pair-wise documents that appeared in the same cluster receive a non-zero similarity score.

Similar to the text clustering module 204 described above, the similarity scores 302, 310, and 316 for document combinations may be set at 100 or a lower value depending on how well the LSA clustering process performed. A manual review can supplement the performance review of the LSA clustering process. After review, the similarity scores for one or more document combinations may be lowered to reflect where the clustering or document similarity process was not accurate (e.g., a significant number of technical documents were clustered with relatively unrelated technical documents). The greater the level of inaccuracy results in a greater amount of reduction in the similarity score.

Figure 4:
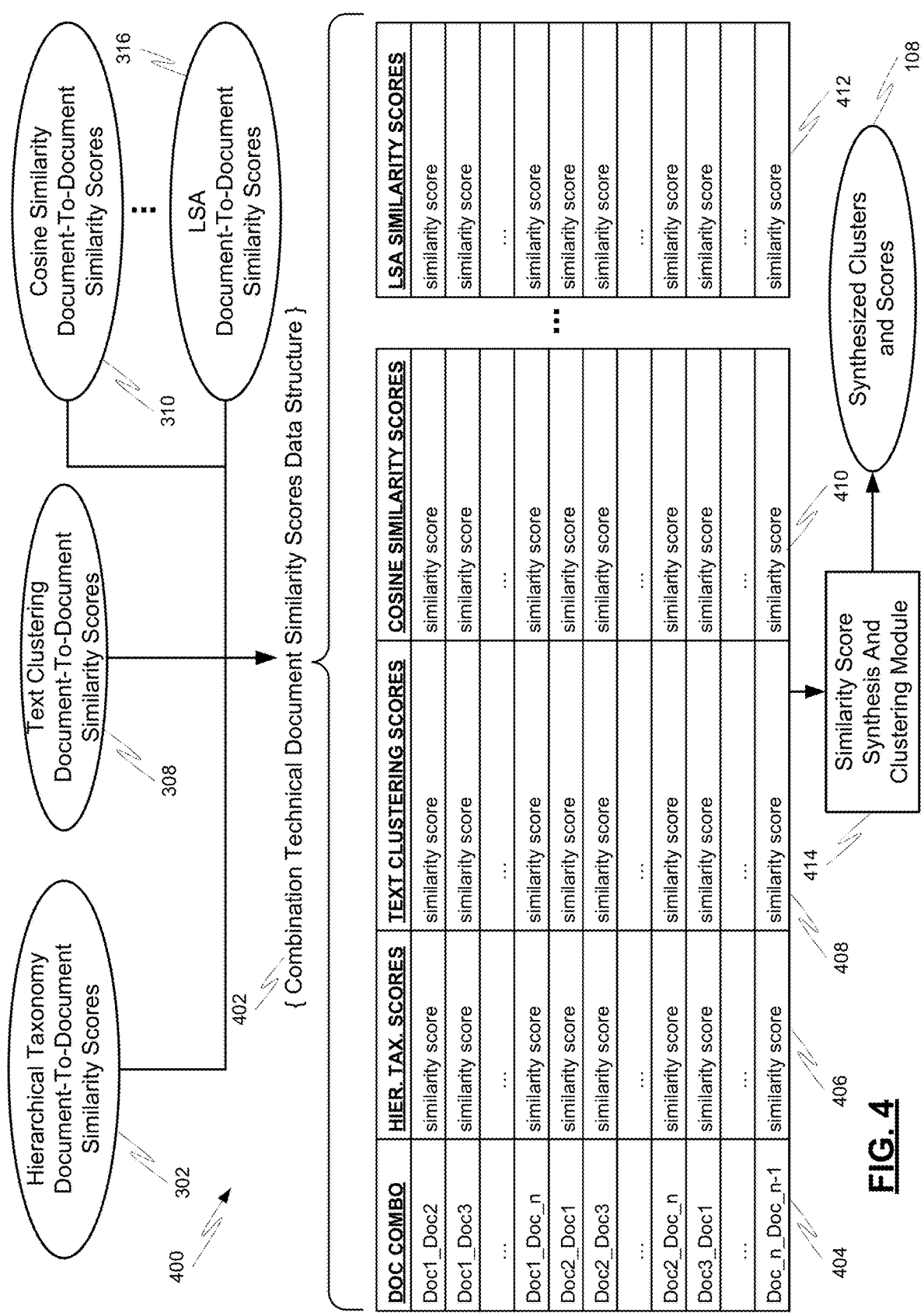
FIG. 4 is a block diagram depicting a process for synthesizing multiple document-to-document similarity scores.

FIG. 4 depicts at 400 a process for synthesizing multiple document-to-document similarity scores 302, 308, 310, and 316 in order to generate synthesized clusters and scores 108. The process 400 includes populating a combination technical document similarity scores data structure 402 with similarity scores 302, 308, 310, and 316.

Each type of similarity scores 302, 308, 310, and 316 is provided with a separate field in data structure 402 so that the scores for the document combinations can be stored for subsequent analysis by the similarity score synthesis and clustering module 414. Field 404 in data structure 402 contains the document pair-wise combination. Technical documents to be analyzed are assigned a unique identifier. For example, the first document to be analyzed can be assigned the identifier "Doc1" and the second document can be assigned the identifier "Doc2." Unique document identifiers are signed in this matter for the remaining documents.

The first data row in data structure 402 contains in field 404 the value "Doc1_Doc2." This indicates that this row contains the similarity scores 302, 308, 310, and 360 for indicating the degree of similarity between Doc1 and Doc2 in fields 406, 408, 410, and 412 respectively.

Module 414 examines the similarity scores associated with Doc1 and Doc2 to generate an overall similarity score for this combination of documents. The overall similarity score can be generated using one or more approaches, such as by averaging the scores, weighting more heavily certain (more reliable) scores, determining an overall score if multiple similarity scores (e.g., two or more scores, three or more scores, etc.) for a document pair are above a predefined high threshold value or set of values, etc.

After overall similarity scores have been generated for the other document combinations and stored in data structure 402, module 414 clusters document combinations with similarity scores above a predetermined threshold in the same cluster. The process of synthesizing multiple similarity scores from different models produces synthesized clusters and similarity scores 108 that reduce the disadvantages of using a text clustering approach which can result in a significant number of unrelated documents being clustered together.

Figure 5:
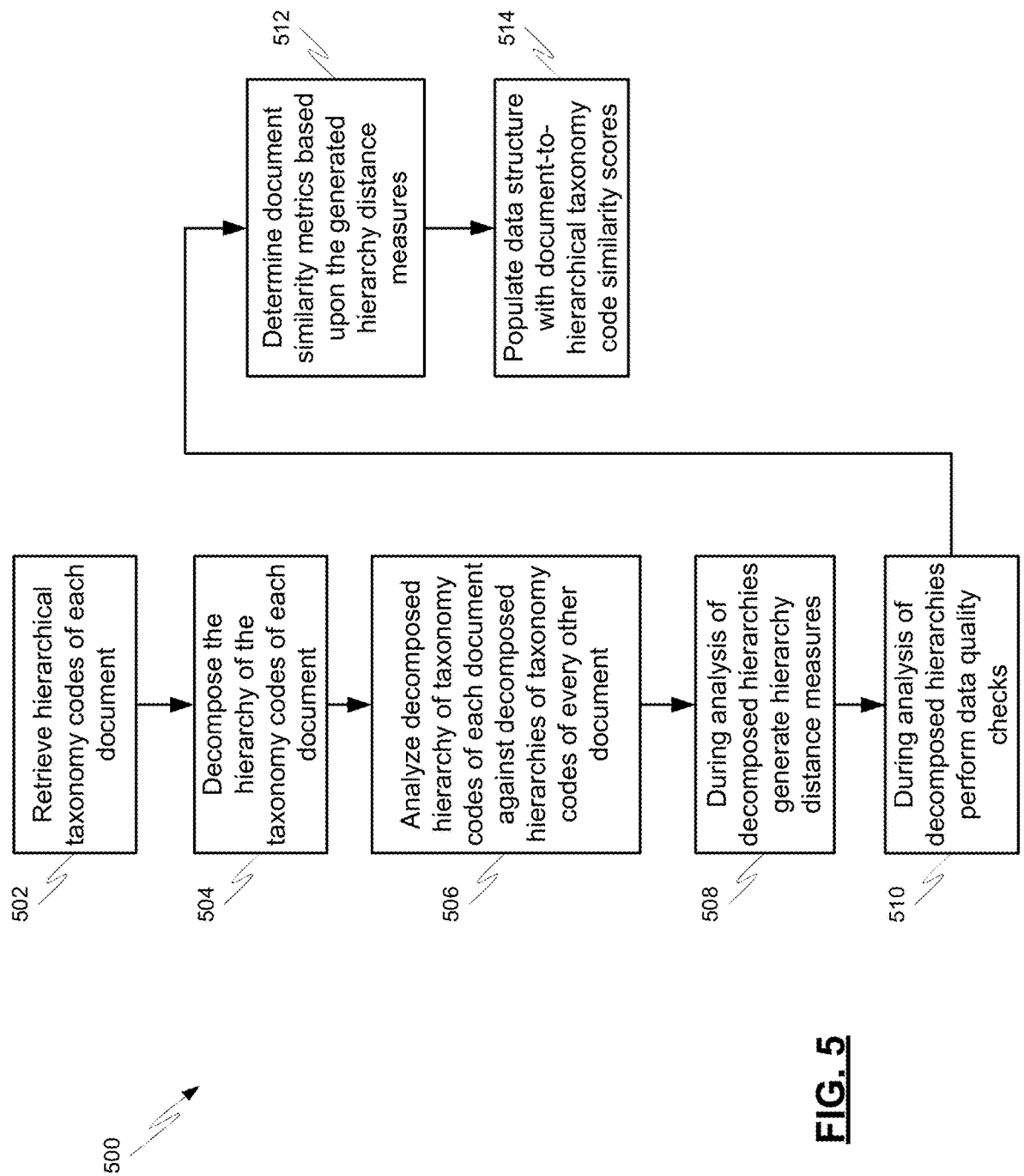
FIG. 5 is a flow chart depicting an operational scenario involving a hierarchical taxonomy code similarity analysis module.

FIG. 5 depicts at 500 an example of operations associated with the hierarchical taxonomy code similarity analysis module. At step 502, the module retrieves the hierarchical taxonomy codes of the technical documents to be analyzed. At step 504, the hierarchy of the taxonomy codes for the documents are decomposed such that each level within the taxonomy hierarchy is identified by the codes associated with the documents. Decomposing the taxonomy codes can be computationally complex because the hierarchical taxonomy may include hundreds of thousands of nodes with multiple parent-child relationships at different levels of depth upon which the technical document's own set of taxonomy hierarchical code structure is to be mapped. This is further complicated if the taxonomy hierarchical structure has multiple parents and/or multiple children for a given node within the hierarchy.

At step 506, pair-wise document analysis is performed using the document codes and their associated taxonomy hierarchies. For example, the analysis determines the degree of similarity between the hierarchical structure of Doc1 as indicated by the codes associated with Doc1 and the hierarchical structure of Doc2 as indicated by the codes associated with Doc2. The degree of similarity is calculated at step 508 based upon the distance separating Doc1's codes within the hierarchy from Doc2's codes within the hierarchy. (FIGS. 6-10 provide an example of the analysis.)

At step 510, data quality checks are performed during the analysis associated with steps 506 and 508. The data quality checks can include whether a particular document is not associated with a sufficient number of taxonomy codes to describe in substantive detail the technical subject matter of the document. For example, the process may continue with the taxonomy hierarchical analysis of steps 506 and 508 for a document that only has one code. In such a situation, the process will indicate that the confidence level associated with the hierarchical taxonomy similarity score generated for this document may be relatively low. For situations where the number of codes associated with each document to be compared is greater than a pre-specified threshold (e.g., three, four, five, etc.), a confidence level can be associated with the hierarchical taxonomy similarity score that is based upon how many hierarchical. The confidence levels can be used to indicate performance of the hierarchical taxonomy code similarity analysis module.

At step 512, a document similarity metric is determined for a document combination based upon the hierarchy distance measures associated with the document combination. At step 514, the combination technical document similarity scores data structure is populated with the hierarchical taxonomy code similarity scores for the document combinations.

Similar to the other process flows described herein, it should be understood that the steps depicted in FIG. 5 may be modified and still achieve the desired output. For example, the data quality check of step 510 can be performed prior to initiating the operations associated with the hierarchical taxonomy code similarity analysis module.

Figure 6:
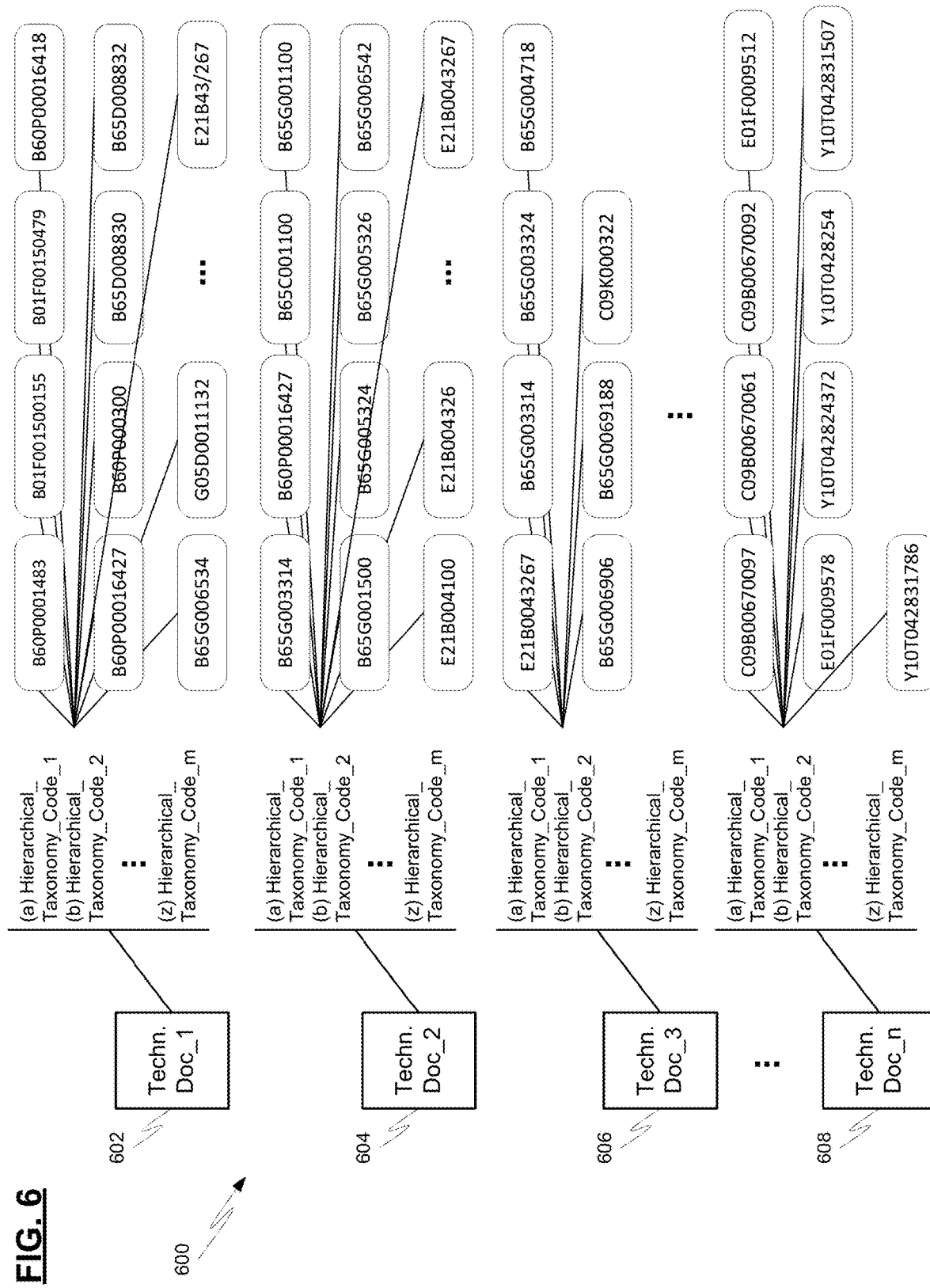
FIG. 6 is a block diagram depicting hierarchical taxonomy codes for technical documents.

FIG. 6 depicts at 600 hierarchical taxonomy codes for technical documents 602, 604, 606, and 608. Technical document 602 has more than eleven codes that describe the technical subject matter of document 602. For example, the first code B60P0001483 of document 602 is a cooperative patent classification (CPC) code. Within the CPC code system, the CPC code B60P0001483 indicates that technical document 602 is related to the following subject matter: vehicles adapted for load transportation or to transport, to carry, or to comprise special loads or objects. The other codes of technical document 602 further describe the document's subject matter. As another example, the second code B01F001500155 of technical document 602 indicates that the document's subject matter also relates to the following technical area: mixing, dissolving, emulsifying, dispersing without chemical reaction. The combination of the two document codes indicate that technical document 602 relates to transportation vehicles where mixing is involved. The greater the number of relevant codes and the greater the level of the codes associated with technical document 602 results in a greater amount of substantive descriptive detail being known about the technical document 602. Where greater confidence in hierarchical taxonomy code similarity is required, then the number of codes for a document to be compared should be greater than a pre-specified threshold and be at a hierarchical depth that provides the desired level of descriptive information (e.g., greater than a level 4 depth or a level 10 depth in the hierarchical taxonomy, etc.).

With respect to the other technical documents, technical document 604 has more than eleven codes that describe the technical subject matter of document 604. Technical document 606 has seven codes that describe the technical subject matter of document 606. Technical document 608 has nine codes that describe the technical subject matter of document

608. The identification of all these codes within the overarching hierarchical taxonomy is described in reference to FIG. 7.

Figure 7:
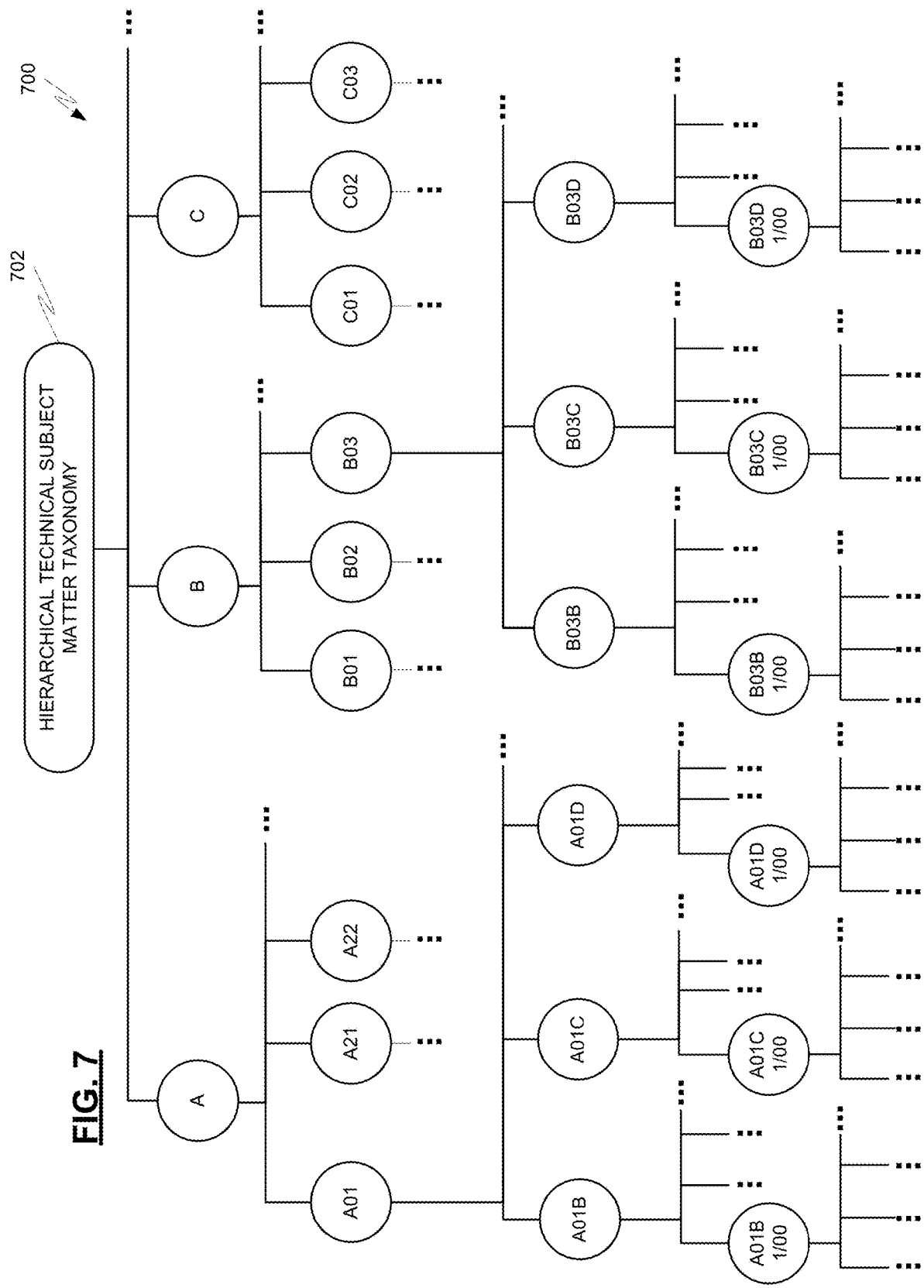
FIG. 7 is a tree diagram depicting a structure of a hierarchical technical subject matter taxonomy.

FIG. 7 depicts at 700 the tree-like structure of the hierarchical technical subject matter taxonomy 702 for the CPC classification system. The hierarchical technical subject matter taxonomy 702 establishes a network of parent-child code relationships for describing technical subject matter at different levels of detail. More specifically, the classification system has over 250,000 codes within the hierarchy 700. The most general levels appear at the top of the hierarchy 700. As the hierarchy is traversed downward, more specific levels are found. For example, code "A" appears towards the top of the hierarchy 700. The code "A" is generally directed to the following area: human necessities. A child node of code "A" is "A01" which is more specifically directed to the following area: human necessities that involve agriculture, forestry, animal husbandry, hunting, trapping, or fishing. Accordingly, a technical document with the code "A01" is directed to devices that assist with the growing of crops. The hierarchical technical subject matter taxonomy can have many levels of depth to describe with greater detail the technical subject matter of the documents. For example, the sixth level of depth provides greater technical description for the technical documents than five levels of depth but results in greater technical computation complexity, especially if the similarity analysis involves over a thousand (or over 100,000 in many situations) parent-child technical subject matter relationships that are associated with the technical documents.

Figure 8:
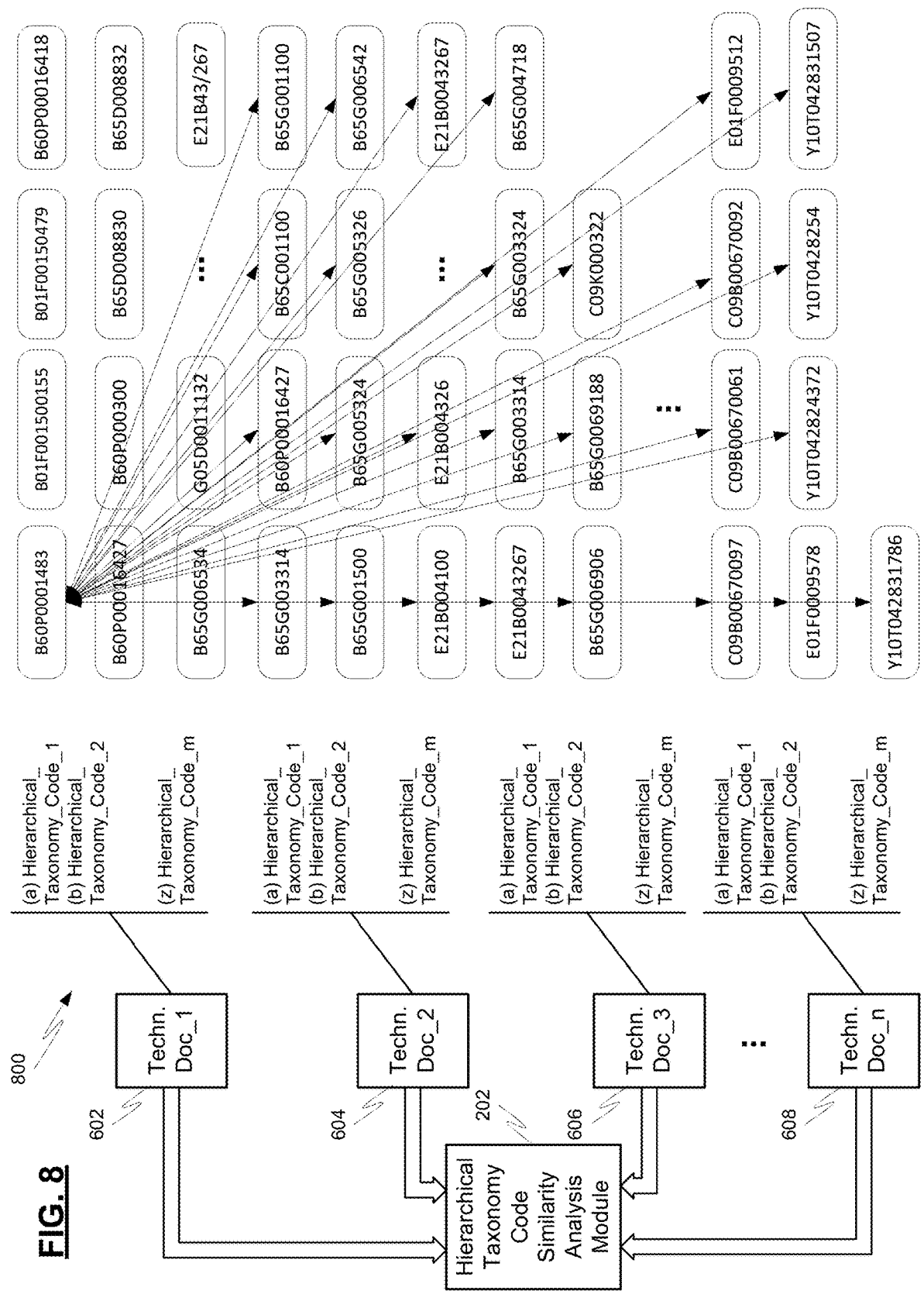
FIGS. 8-10 are tree diagrams depicting a hierarchical taxonomy code clustering module analyzing codes associated with technical documents.

FIG. 8 depicts at 800 the hierarchical taxonomy code similarity analysis module 202 analyzing the first code of technical document 602 against the codes of all other technical documents. As an illustration, module 202 uses the structure of the hierarchy shown in FIG. 7 to determine the degree of similarity between the first code (B60P0001483) of document 602 and the first code (B65G003314) of technical document 604. In this example, module 202 performs a node traversal distance measurement between the first document's code B60P0001483 and the second document's code (B65G003314). The resulting traversal distance within the CPC hierarchy of FIG. 7 indicates that there is not a significant degree of similarity between the two codes and thus this particular combination of codes of document 602 and 604 would have a low similarity score, such as 20.

The hierarchy similarity analysis results are different for the next combination of codes for technical documents 602 and 604. In this combination, the first code (B60P0001483) of document 602 and the second code (B60P00016427) of technical document 604 have a small node traversal distance within the hierarchy of FIG. 7 and thus have a higher similarity score, such as 65. As shown in FIG. 8, the hierarchical taxonomy degree of similarity analysis continues for multiple other combination of technical document 602's first code and the other codes of all other technical documents (e.g., technical documents 604, 606, and 608). The node traversal distance measurement based upon multiple parent-child hierarchical data and the hierarchical taxonomy degree of similarity are determined for each remaining combinations of hierarchical taxonomy codes. In this example, overall node transversal distance measurements are determined for each pairwise of documents so that the overall hierarchical taxonomy code similarity score can be determined. As an illustration, the smaller the overall node traversal distance between two technical documents, the higher will be the value for the overall hierarchical taxonomy code similarity score between the two technical documents.

Figure 9:
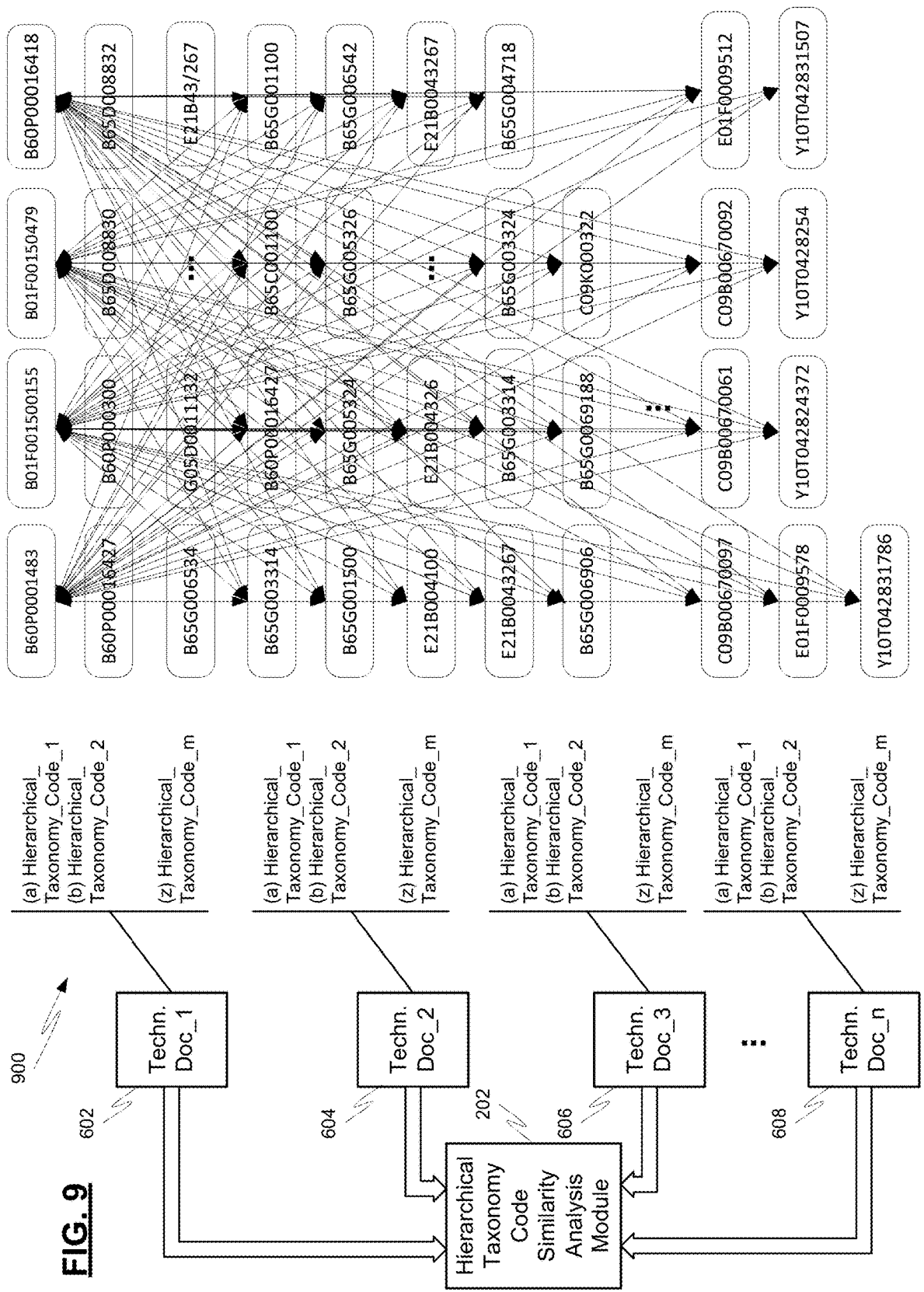

FIG. 9 illustrates at 900 the significantly large number of hierarchical taxonomy analysis that is performed for merely one technical document. FIG. 9 is only displaying the number of code hierarchy analysis that is performed for the first four codes of technical document 602 relative to the codes of all other technical documents 604, 606, and 608. FIG. 9 illustrates the computational complexity associated with the hierarchical taxonomy code clustering process is intensive. Even for a relatively small analysis of determining hierarchical code similarity of 1000 documents to another 1000 documents (with each having on average six hierarchical taxonomy codes), the number of hierarchical code analysis combinations for processing is 36,000,000. The technical complexity in analyzing the multiple interrelationships is significantly increased because the documents are assigned to multiple categories within the hierarchical taxonomy.

An approach to reduce the processor-intensive hierarchical code calculations is to vary the hierarchy level that will undergo analysis by the hierarchical taxonomy code clustering module 202. For example, the module 202 may be configured to examine only the first two tiers of the hierarchy. Accordingly, the calculations are reduced when performing a node traversal distance measurement between the first document's code B60 (at the second tier) and the second document's code B65 (at the second tier). Another approach is to perform a staged hierarchical taxonomy analysis where a first stage performs hierarchical taxonomy code similarity analysis at a higher level of depth within the hierarchy (e.g., a more generalized level 2). A second stage can perform hierarchical taxonomy code similarity analysis at a lower level of depth within the hierarchy (e.g., level 10, level 11, etc.) upon any pairs of technical documents that had a hierarchical taxonomy similarity score greater than zero (or another pre-specified threshold) generated during the first stage.

As another approach to reduce the processor-intensive hierarchical code calculations, any duplicate node traversal calculations can be eliminated. For example, the node transversal calculations for a first technical document to a second technical document can be used for the second technical document to first technical document node transversal calculations. It should be understood, however, that hierarchical taxonomy code similarity scores may be generated other than through node transversal measurements and may result in different hierarchical taxonomy code similarity scores being generated depending upon whether the hierarchical taxonomy codes for the first technical document is being compared to the second document or the hierarchical taxonomy codes for the second technical document is being compared to the first document. For example, the hierarchical taxonomy code similarity score may change based upon the order of the technical documents being compared, such as one of the technical documents having a number of hierarchical taxonomy codes less than a pre-specified threshold.

Figure 10:
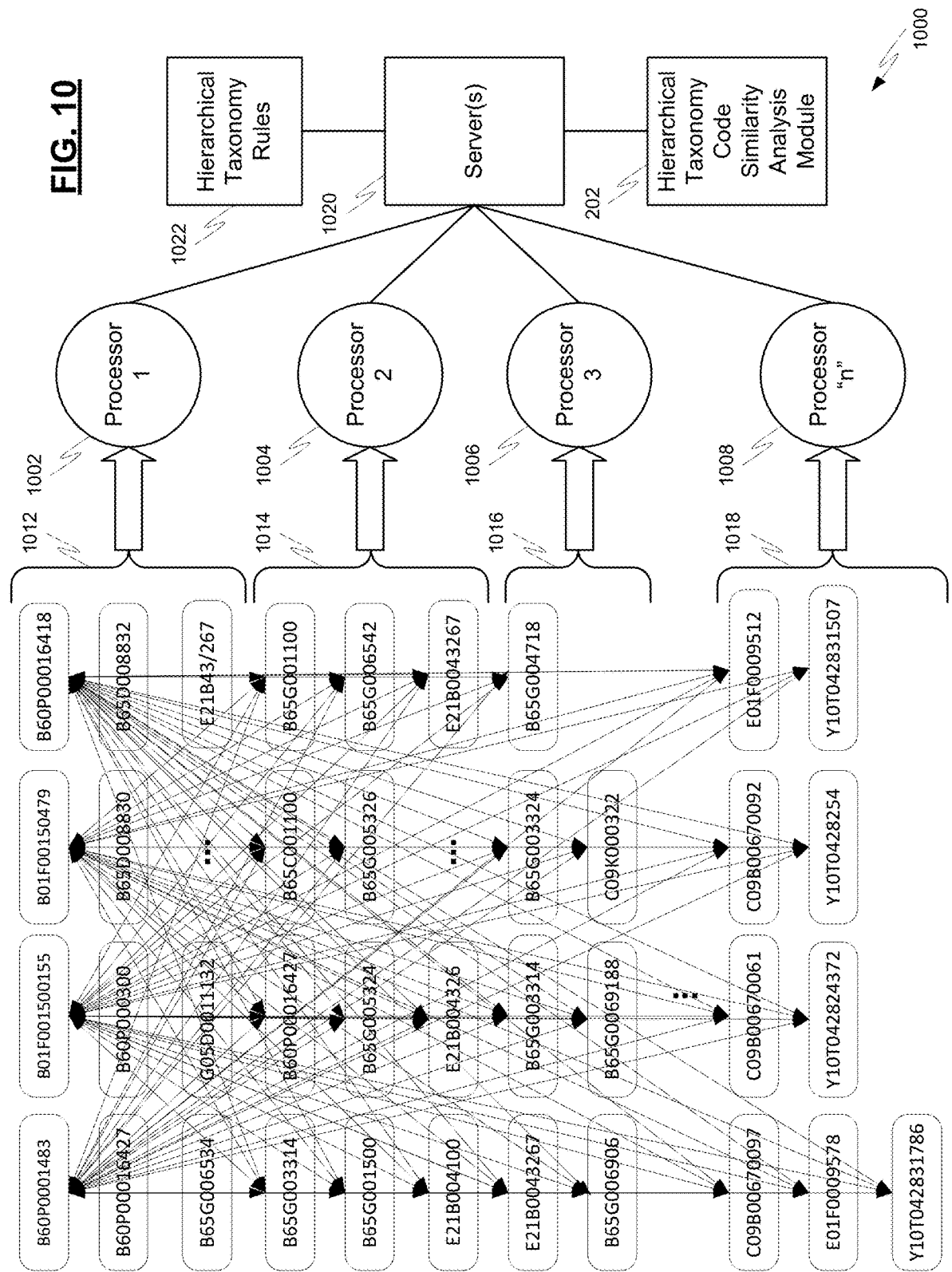

FIG. 10 depicts at 1000 another approach to address the significant processing complexity of the hierarchical taxonomy code similarity analysis module 202. A parallel processing approach can be used to process in parallel separate sets of hierarchical code analyses. For example, the first processor 1002 can perform the hierarchical code similarity analysis for the codes associated with the first technical document. The second processor 1004 can perform the hierarchical code similarity analysis for the codes associated with the second technical document. The third processor 1006 can perform the hierarchical code similarity analysis for the codes associated with the third technical document. The n-th processor can perform the hierarchical code similarity analysis for the codes associated with the n-th technical document. If there is a limited number of processors, then a processor can move onto another predetermined technical document to process after the processor has completed its processing of an assigned technical document.

Each of the processors have access to hierarchical taxonomy rules 1022 that contain the structure of the hierarchical taxonomy code hierarchy such as the hierarchy shown in FIG. 7. The hierarchical taxonomy rules 1022 indicate parent-child relationships between the nodes within the hierarchy. While executing on a particular processor, the hierarchical taxonomy code similarity analysis module 202 accesses the hierarchical taxonomy rules 1022 for determining node transversal distances. The parallel processing approach can be used alone or in combination with other clustering or document similarity approaches (e.g., the staged hierarchical taxonomy similarity analysis described above, text clustering similarity analysis, etc.).

Figure 11:
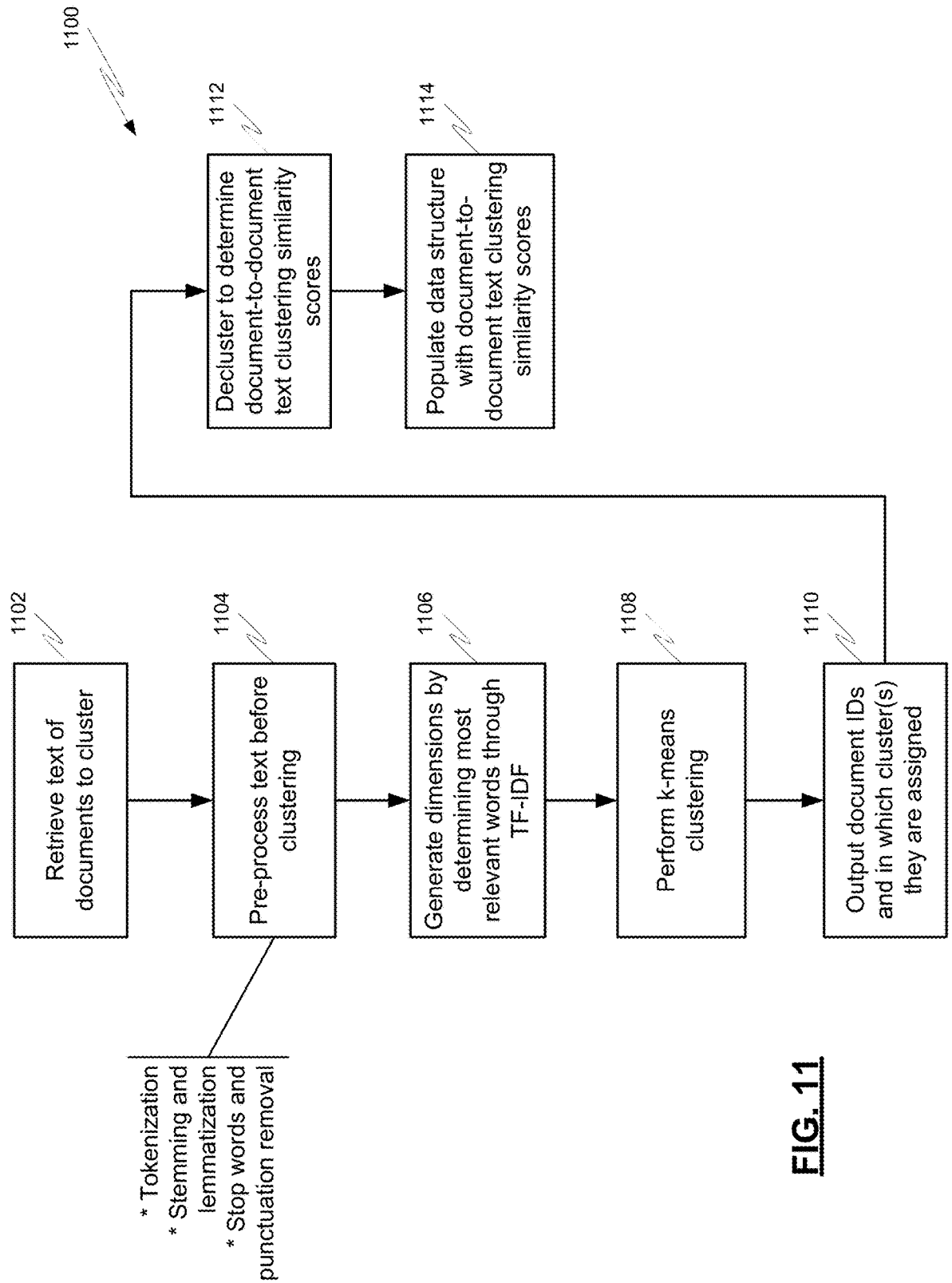
FIG. 11 is a flow chart depicting an operational scenario for text clustering.

FIG. 11 depicts at 1100 another model within the model collection for determining document-to-document similarity scores. In this example, the text clustering model uses a k-means algorithm to analyze document text to generate the similarity scores. The k-means clustering algorithm groups similar observations in clusters in order to extract insights from the document text.

At step 1102, the text of the documents to be processed are retrieved. The text may be preprocessed at step 1104 before k-means clustering occurs. Examples of preprocessing include tokenization, stemming, lemmatization, stop words and punctuation removal. At step 1106, word vectors are generated through the term frequency-inverse document frequency (TF-IDF) approach.

At step 1108, the k-means algorithm assigns k random seeds in the word vector space as initial means of the k clusters. Observations are grouped in k clusters based on the distance from each of the seeds. The observation is included in the n-th cluster if the distance between the observation and the nth point is a minimum when compared to other seeds. Next, the actual mean of each cluster is recalculated. Based on the shift of the means, the data points are reassigned. The process repeats itself until the means of the clusters become relatively constant (e.g., the same points are assigned to each cluster in consecutive iterations).

At step 1110, document IDs and the cluster(s) to which they are assigned are provided as output to step 1112 where the output data is declustered. The declustered data set contains pair-wise documents and text cluster similarity scores. At step 1114, the combination technical document similarity scores data structure is populated with the text cluster similarity scores.

As an example of the k-means text processing, the following python pseudocode can be used.

```
from sklearn.cluster import KMeans
import nltk
from nltk.stem import WordNetLemmatizer
from nltk import word_tokenize
from nltk.corpus import stopwords
from sklearn.cluster import KMeans
from sklearn.metrics import adjusted_rand_score
from sklearn.feature_extraction.text import TfidfVectorizer
from sklearn.metrics import silhouette_score
...
model = KMeans(n_clusters=best_K, init='k-means++', max_iter=100, n_init=1)
model.fit(X)
```

Figure 12:
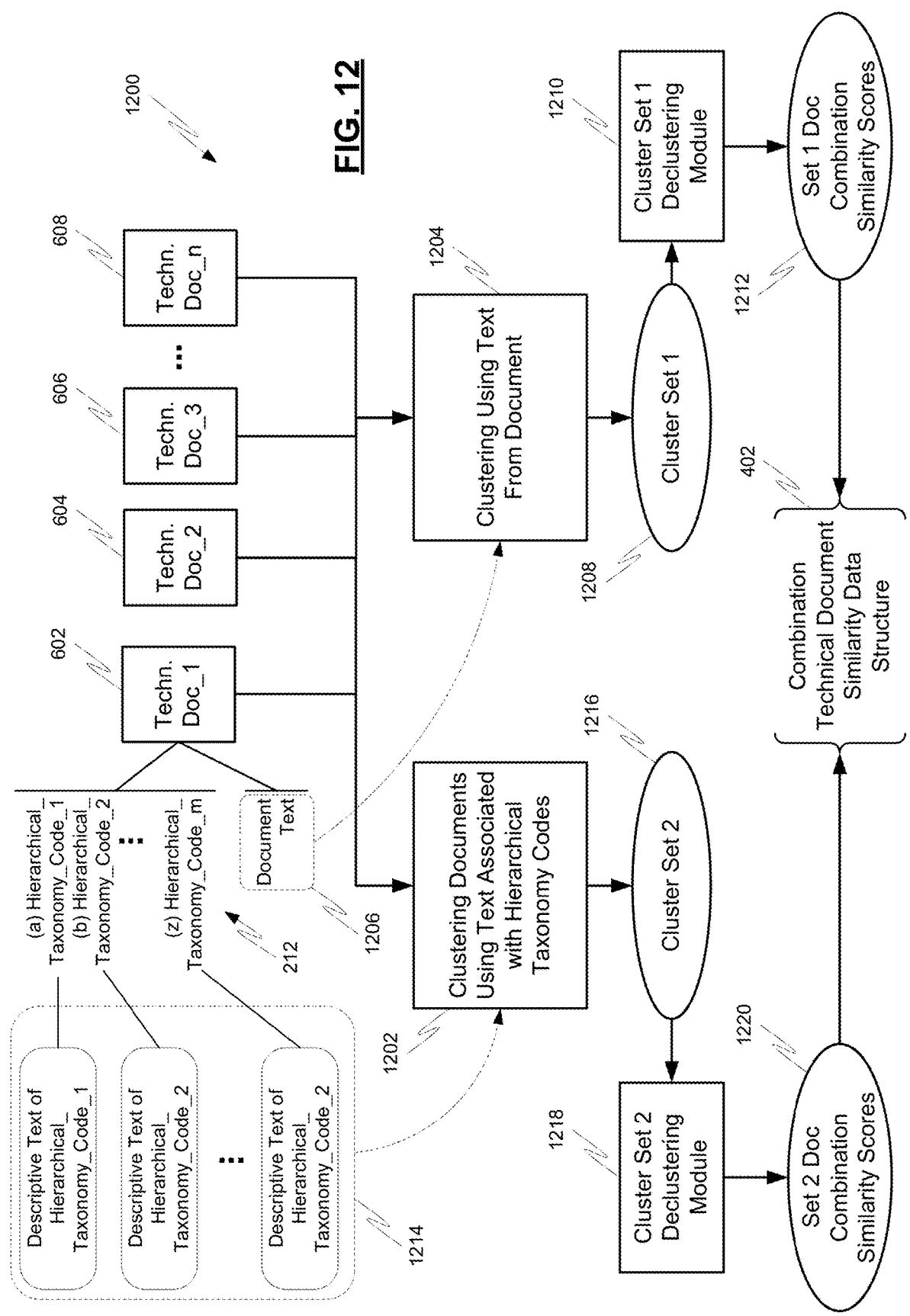
FIG. 12 is a block diagram depicting text clustering operations.

FIG. 12 depicts at 1200 that text clustering can involve more than the text of a technical document (e.g., document's title, abstract, body, etc.). Module 1202 performs text clustering using the descriptive text of the hierarchical taxonomy codes associated with a document, such as the descriptive text shown at 1214 for technical document 602. As an example, the descriptive text of a hierarchical taxonomy code can include the descriptive text associated with the code and the descriptive text associated with all of its parents. This may be accomplished through a combination of the code's text and its parents' text. As an illustration, the code A01D004302 can have the following cumulative descriptive text for clustering of any documents associated with such a code: "human necessities; agriculture; forestry; animal husbandry; hunting; trapping; fishing; harvesting; mowing; mowers combined with apparatus performing additional operations while mowing with rakes." Most technical documents have multiple codes whose text are combined and then clustered by module 1202.

The second set of cluster results 1216 from module 1202 is declustered by module 1218 so that a second set of similarity scores are generated for populating data structure 402. This can be done separately or in parallel with the text clustering of module 1204. The output cluster set 1208 from module 1204 is declustered by module 1210 so that the resulting similarity scores can be stored in data structure 402. The similarity scores 1212 and 1220 can be stored separately in data structure 402 or can be combined (e.g., averaged, weighted differently, etc.) and stored in a field in data structure 402.

As shown in FIG. 12, text clustering of the technical documents' textual content is performed separately from the text clustering of descriptive code text associated with the technical documents' hierarchical taxonomy codes. It should be understood that different configurations can be result in text clustering of the technical documents' textual content is performed with the text clustering of descriptive code text associated with the technical documents' hierarchical taxonomy codes. For example, the descriptive code text can be added to the textual content (e.g., title, abstract, document's entire text, etc.) for text clustering.

Figure 13:
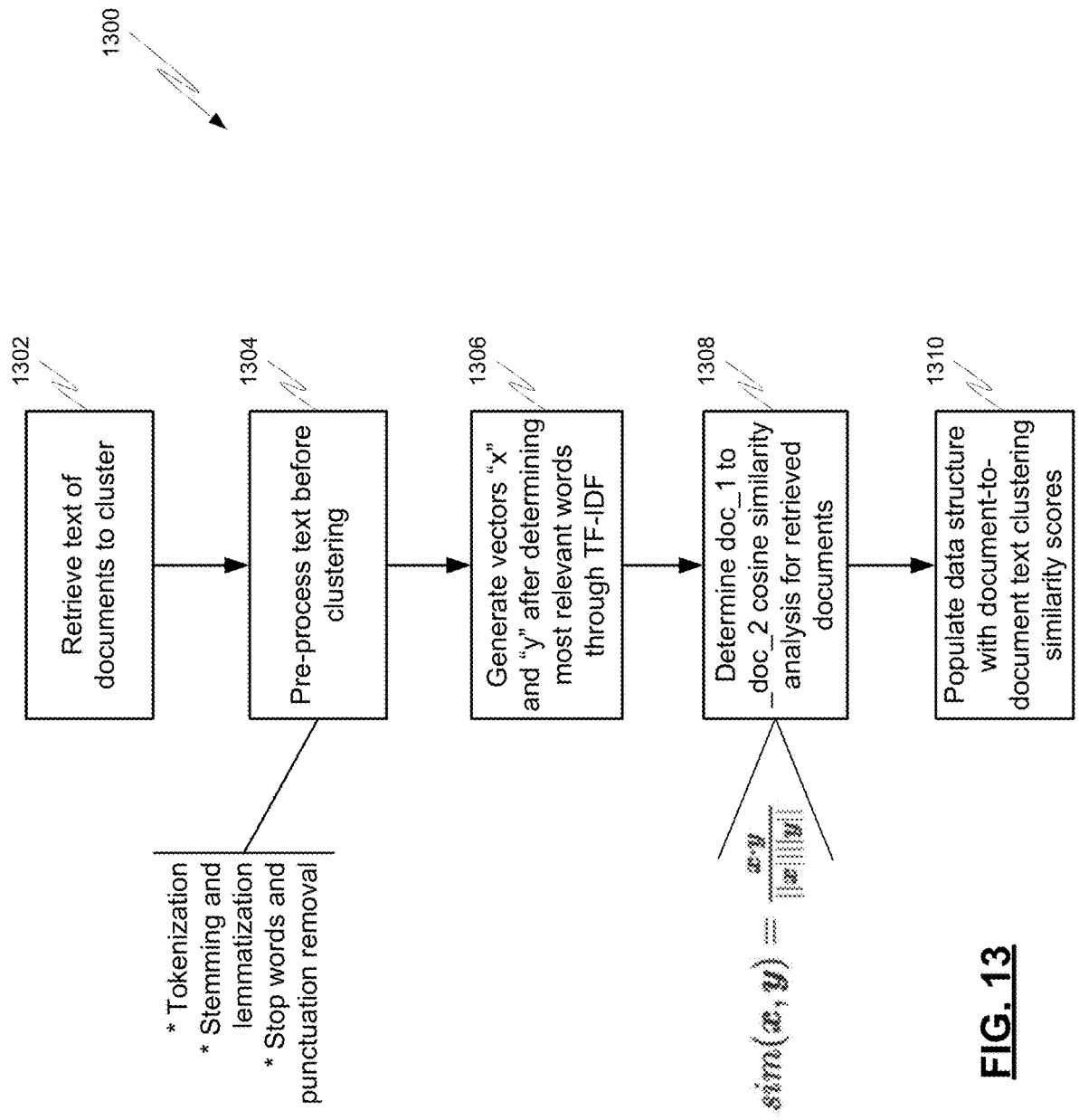
FIG. 13 is a flow chart depicting an operational scenario of cosine similarity operations.

FIG. 13 depicts at 1300 another model within the model collection for determining document-to-document similarity scores. In this example, the model uses a cosine similarity algorithm to analyze document text to generate the similarity scores. The output of the cosine similarity algorithm is a number from 0 to 1 where 0 indicates that there is no similarity and 1 indicates exact similarity.

At step 1302, the text of the documents to be processed are retrieved. The text may be preprocessed at step 1304 before cosine similarity analysis occurs. Examples of pre-processing include tokenization, stemming, lemmatization, stop words and punctuation removal. At step 1306, word vectors are generated through the term frequency-inverse document frequency (TF-IDF) approach. At step 1308, cosine similarity analysis is performed where distances between word vectors determine degree of similarity between two or more documents. The cosine similarity analysis generates similarity values between 0 and 1 for the analyzed documents. This range is multiplied by 100 in order to place the similarity values on the same scale as the document similarity scores from the other approaches. At step 1310, the combination technical document similarity scores data structure is populated with the cosine similarity scores for pairs of technical documents.

Figure 14:
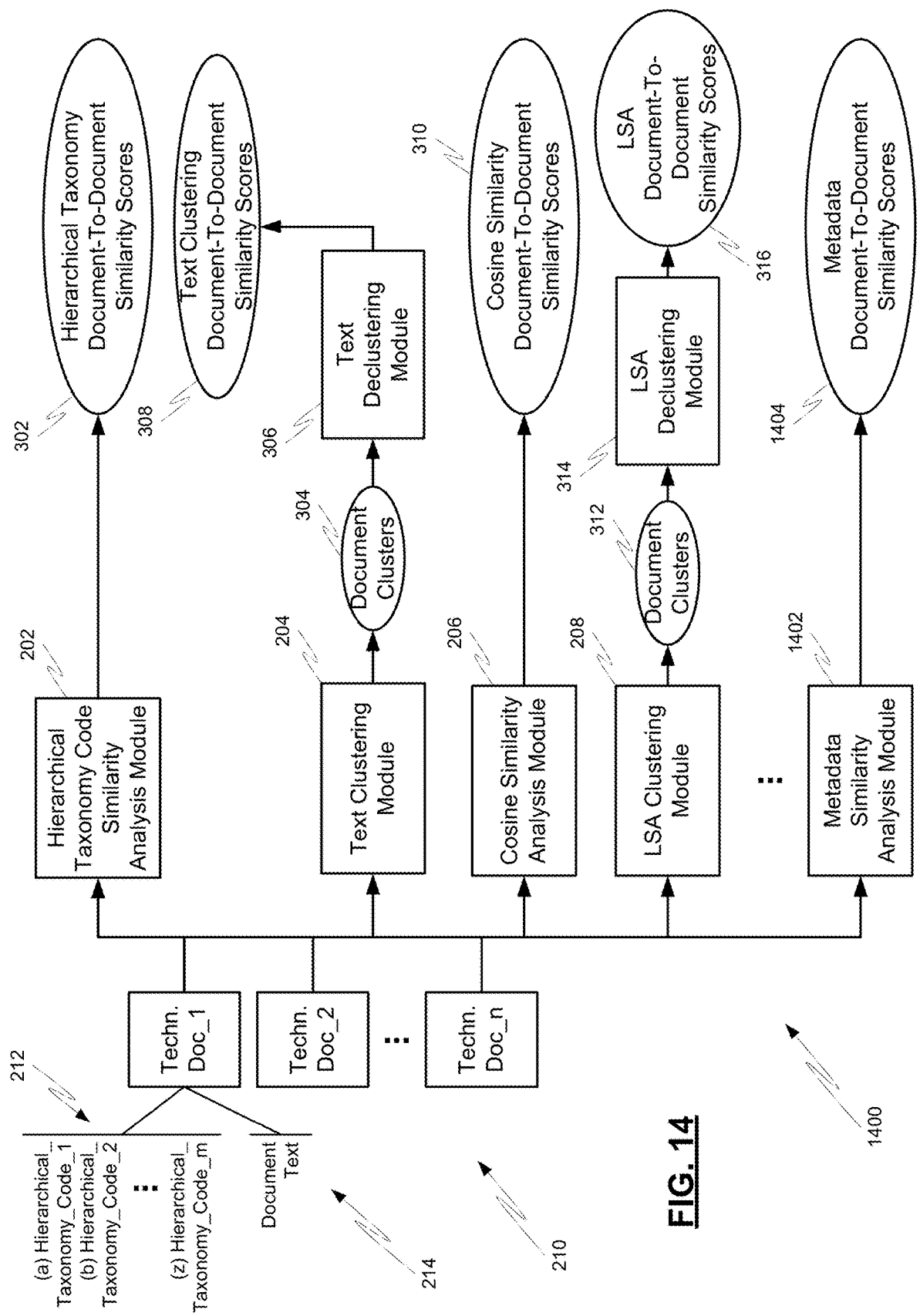
FIG. 14 is a block diagram depicting metadata similarity operations.

FIG. 14 depicts at 1400 another model in module 1402 which analyzes the degree of similarity in the metadata between two technical documents. Module 1402 generates the similarity scores 1404 based upon the document metadata analysis. Operations associated with module 1402 are shown in FIG. 15.

Figure 15:
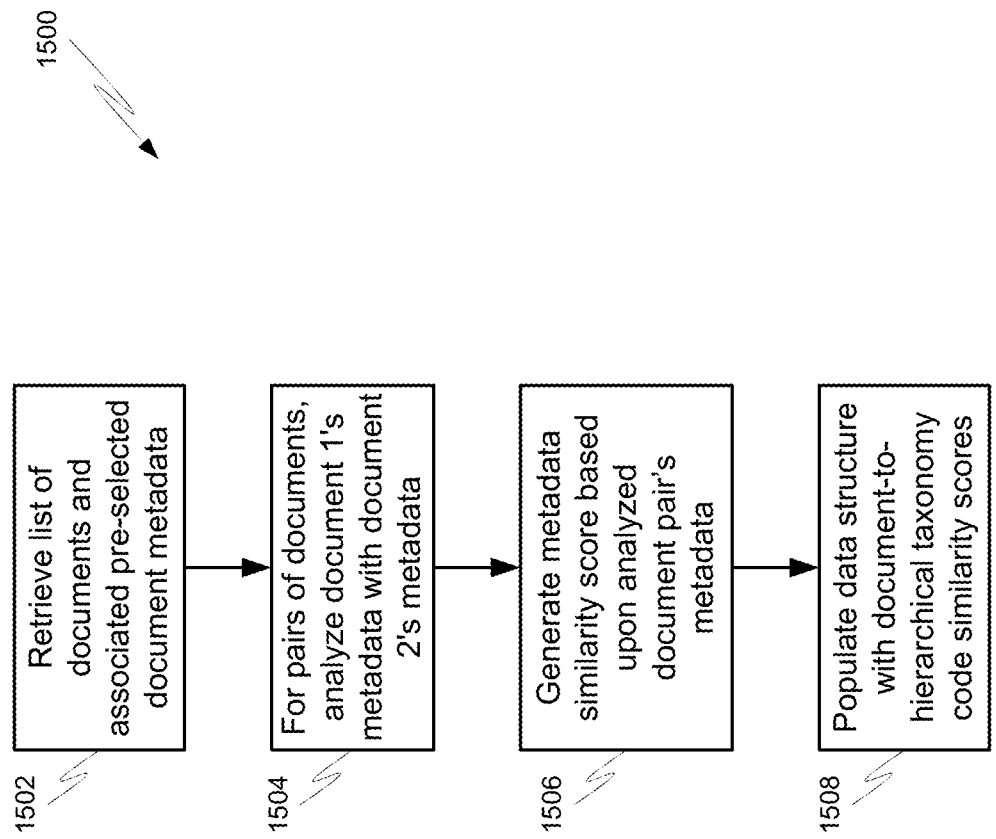
FIG. 15 is a flowchart depicting an operational scenario of metadata similarity operations.

FIG. 15 depicts at 1500 operations for determining similarity scores based on technical document metadata. At step 1502, the list of technical documents and their associated pre-selected document metadata are retrieved. At step 1504, a document's metadata is compared to other documents' metadata. For example, if the document is a technical journal article, then a match of one or more authors with another document provides an indication of similarity in technical subject matter between the two documents. As another example, if the technical documents are patents, then a patent being in the same patent family as another patent provides an indication of similarity in technical subject matter between the two documents. At step 1506, metadata similarity scores are generated based upon the analyzed documents' metadata. If multiple metadata similarity analysis is performed, then the metadata similarity scores can be stored separately in data structure or can be combined (e.g., averaged, weighted differently, etc.) and stored in a field in data structure. At step 1508, the combination technical document similarity scores data structure is populated with the metadata similarity scores.

Figure 16:
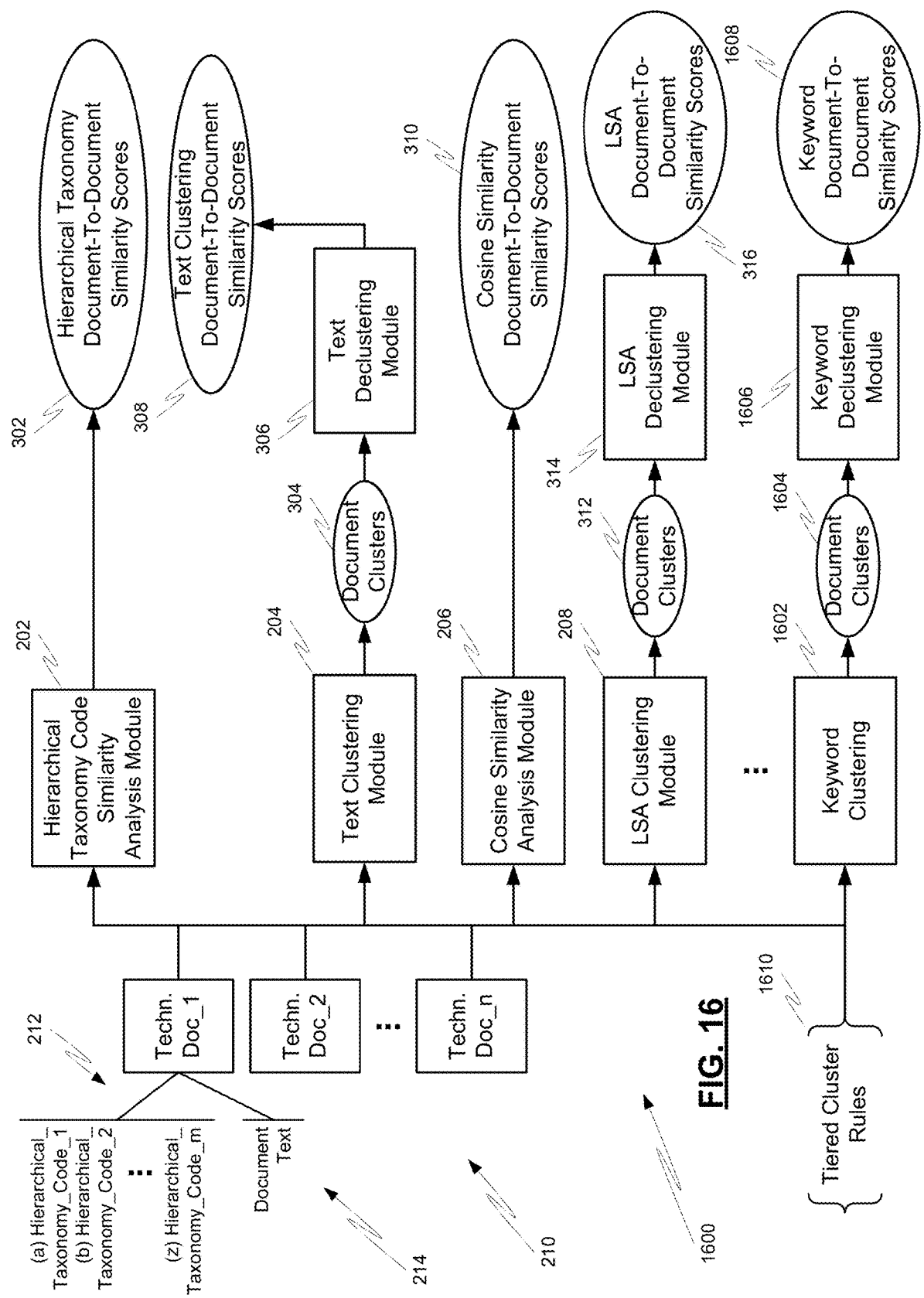
FIG. 16 is a block diagram depicting keyword clustering operations.

FIG. 16 depicts at 1600 a model using keyword clustering 1602. Documents containing one or more pre-specified keywords are grouped together into document clusters 1604. For example, documents containing the phrase "airplane engine" are placed in the same cluster, and documents containing the phrase "airplane landing gear" are placed in a different cluster; etc.

Module 1606 declusters the document clusters 1604 so that keyword similarity scores 1608 can be generated for document combinations. Pair-wise documents that appear in the same cluster receive a non-zero similarity score. The similarity score for such pair-wise documents may be set at 100 or a lower value depending on how well the module 1602 indicates the keyword clustering process performed. For example, the keyword clustering module 1602 can also use tiered clustering rules 1610 to specify probabilities that documents meeting pre-specified search criteria are similar and thus should be clustered together.

FIG. 17 depicts at 1700 an example of tiered clustering rules. The clustering rules are associated with tiers where Tier_1 indicates clusters of documents having high probabilities (e.g., weights) of being related to a specific topic or cluster name (e.g., "robotic controllers" for rule 1.1.1). A lower tier (e.g., Tier_5) indicates clusters of documents that have low probabilities (e.g., weights) of being related to a specific topic or cluster name (e.g., "robotic controllers" for rule 5.1.1). Searches at different tiers can be combined to yield clusters of documents that are at a higher tier as illustrated by cluster rule 1.1.2.

A document that satisfies a particular clustering rule is paired with each other document in that cluster. This process creates a set of pairs of documents from that cluster that receive a similarity score of that clustering rule's weight.

Figure 18:
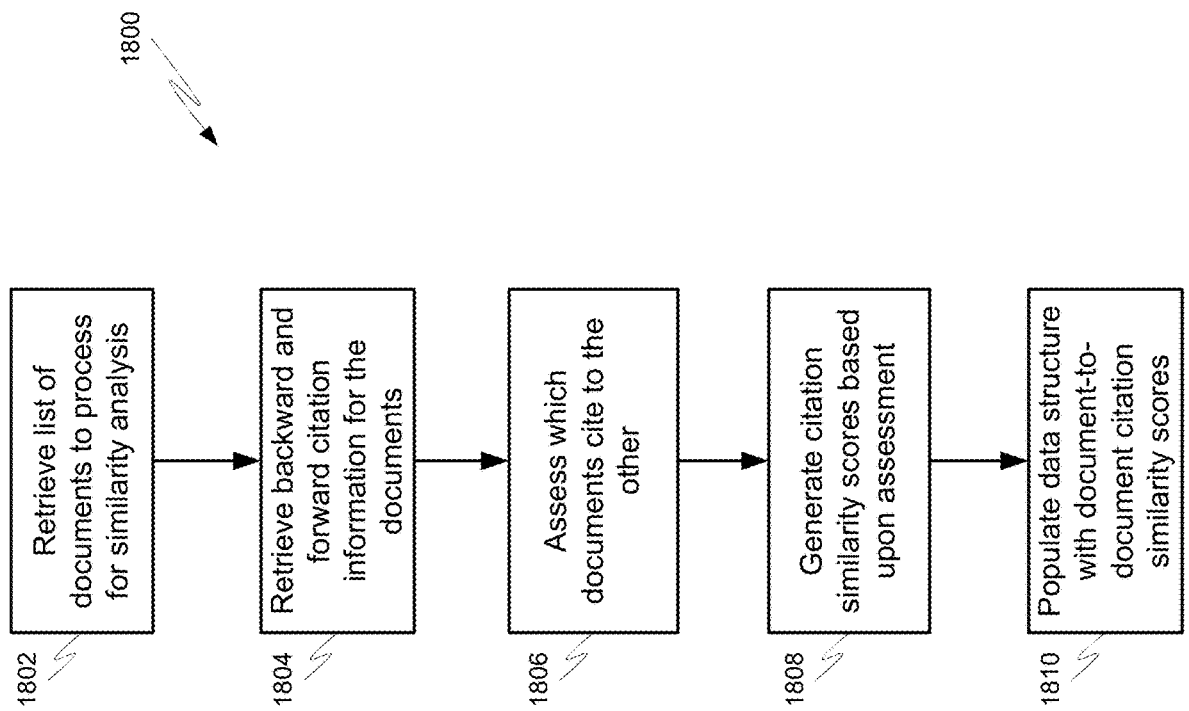
FIGS. 18-19 are flowcharts depicting citation clustering operations.

FIG. 18 depicts at 1800 another model within the model collection. The model 1800 is related to determining degree of document similarity based upon whether two documents cite to each other. At step 1802, a list of documents to process is retrieved. At step 1804, forward and backward citation information is retrieved for the documents. Step 1806 determines whether a document within the retrieved document list cites to another document in the list. Step 1806 may determine citation relationships in the case of patent documents by accessing patent databases that contain backward and forward citation information. Step 1806 may also determine citation relationships in the case of non-patent documents by accessing journal bibliographic databases that contain journal or article citation information. If a document cites to another, then step 1808 provides a relatively high similarity score (e.g., 80) for that document combination. A lower similarity score may be used if analysis determines that a document indiscriminately cites to a large number of documents (e.g., over 75 citations, over 100 citations, etc.). At step 1810, the combination technical document similarity scores data structure is populated with the citation similarity scores for document combinations.

Figure 19:
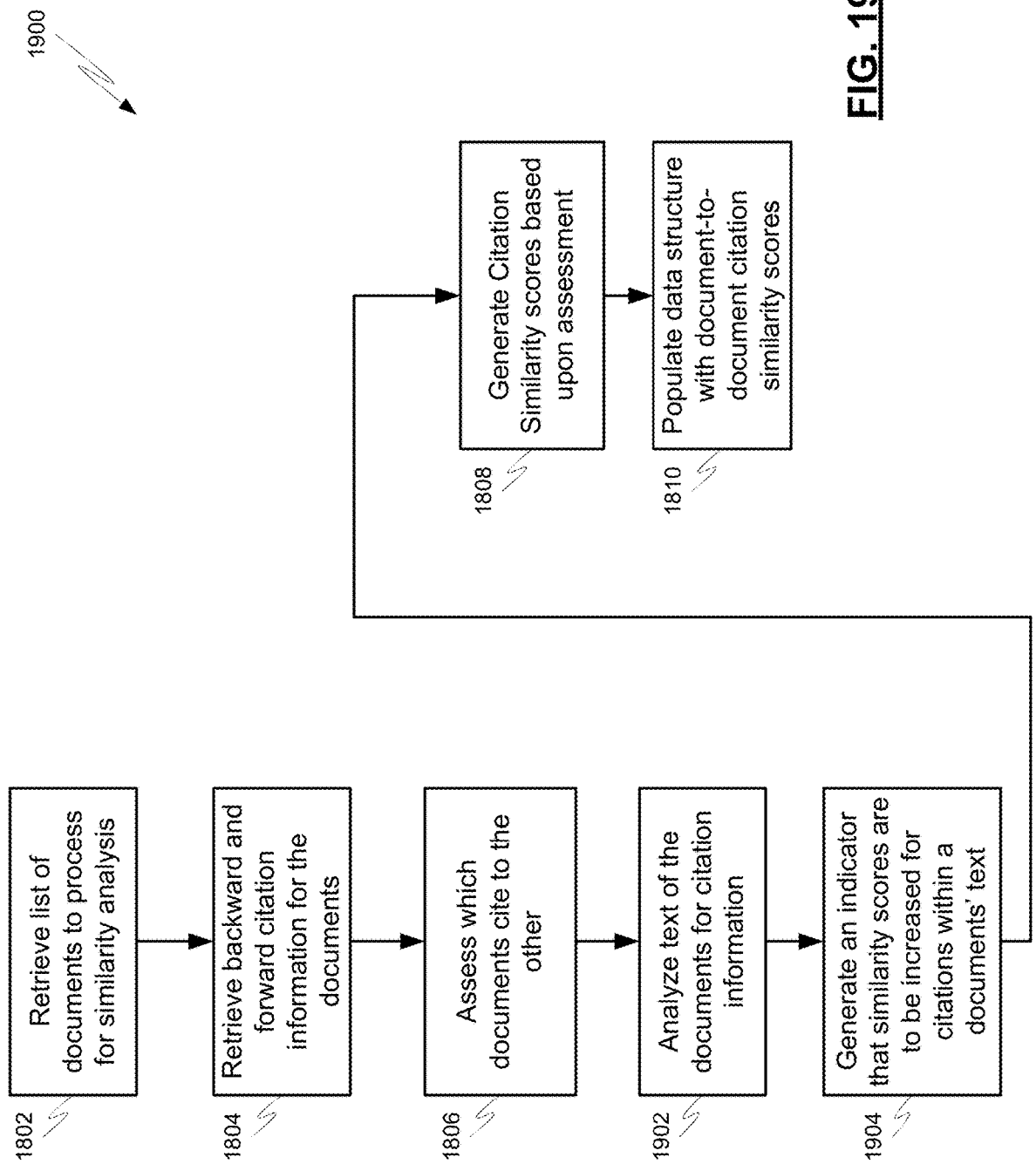

Additional information can supplement any of the technical document similarity analysis described herein. For example, FIG. 19 depicts at 1900 that the similarity analysis process of FIG. 18 can be supplemented with analysis of the documents' text. More specifically, step 1806 can examine citation databases and/or can analyze text at step 1902 of the documents to determine whether a document cites to another document within the actual text of a document (e.g., patent's specification, journal's body of text, etc.). Step 1904 generates an indicator that similarity scores are to be increased for citations found within a documents' text. If a documents is found to cite to another document as determined by step 1806 and/or step 1902, then step 1808 provides a relatively high similarity score for that document combination. At step 1810, the combination technical document similarity scores data structure is populated with the citation similarity scores.

Figure 20:
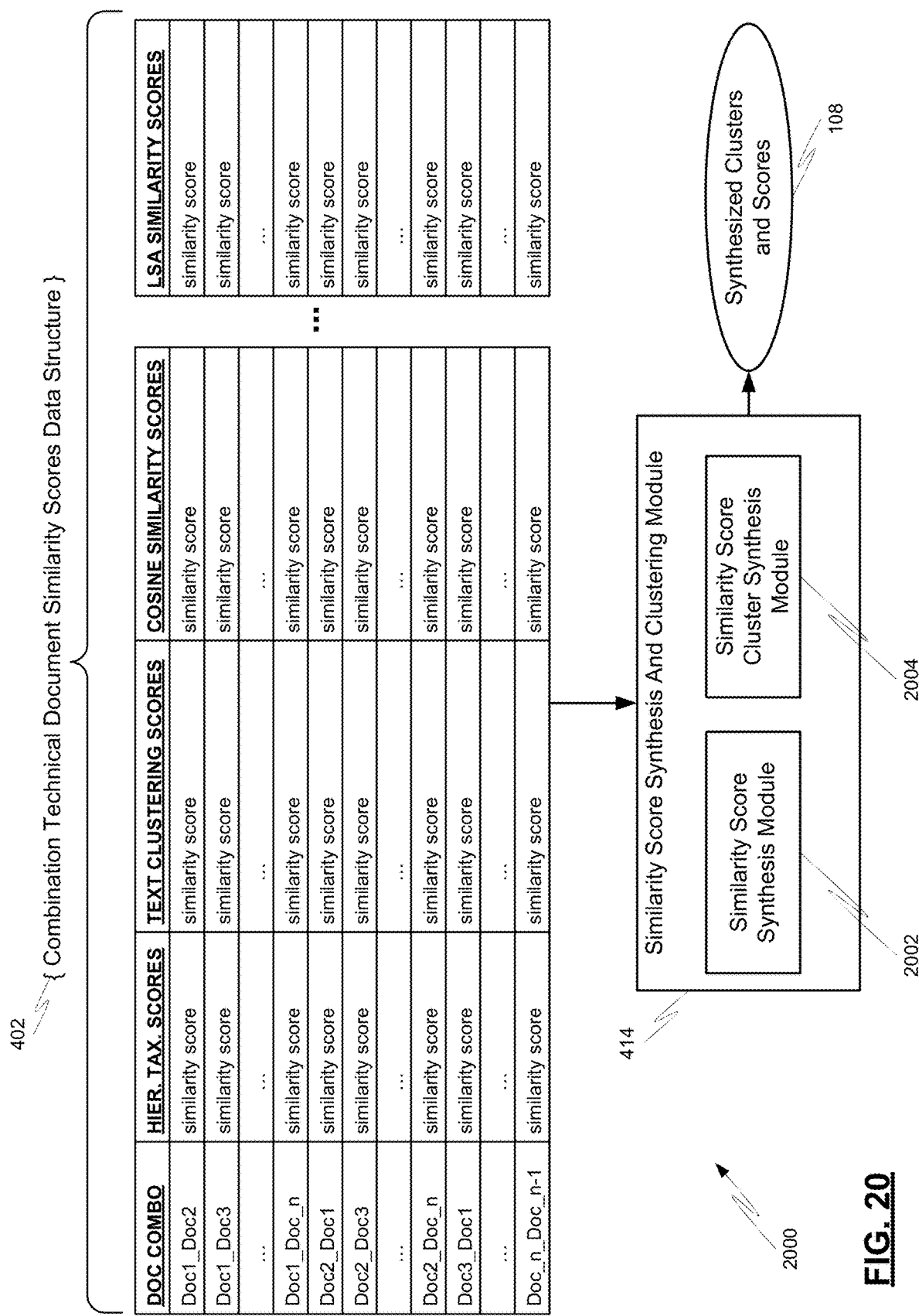
FIG. 20 is a block diagram depicting cluster synthesis operations.
Figure 21:
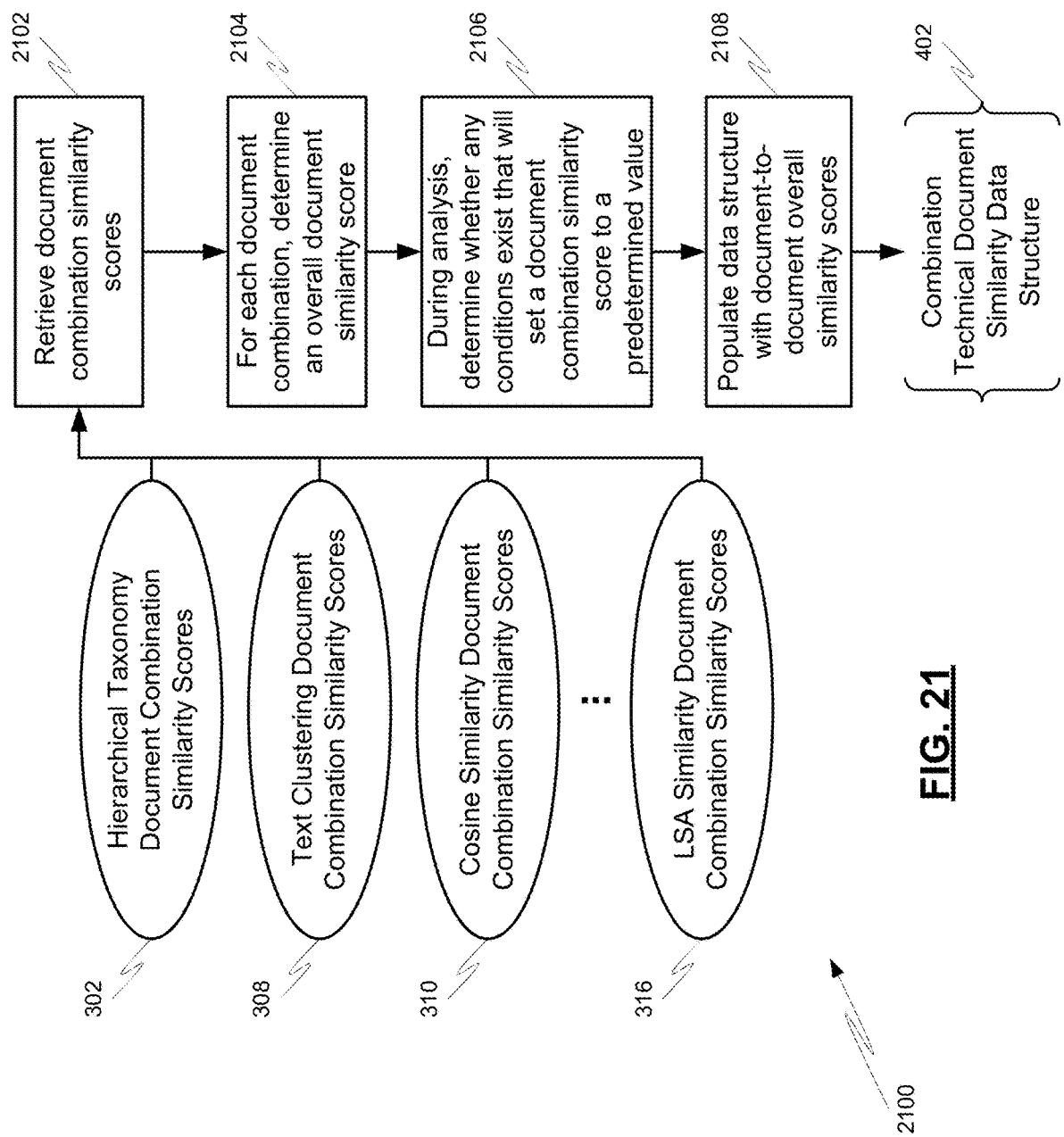
FIGS. 21-22 are flowcharts depicting operational scenarios of cluster synthesis operations.

FIG. 20 depicts at 2000 that module 414 uses modules 2002 and 2004 to generate the synthesized clusters and scores 108. Operational steps that module 2002 can execute are shown in FIG. 21. Operational steps that module 2004 can execute are shown in FIG. 22.

FIG. 21 depicts at 2100 generation of overall similarity scores for each combination of documents. The individually generated similarity scores 302, 308, 310, and 316 by the models in the model collection are processed. At step 2102, document combination similarity scores are retrieved. At step 2104, an overall document similarity score is determined for each document combination. The overall similarity score can be generated using one or more approaches, such as by averaging the scores, weighting more heavily certain (more reliable) scores, determining an overall score if multiple similarity scores (e.g., two or more scores, three or more scores, etc.) for a document pair are above a pre-defined high threshold value or set of values, etc.

During the analysis at step 2104, step 2106 can determine whether any conditions exist that will set a document combination similarity score to a predetermined value. For example, if two documents are within the same patent family, then the overall similarity score should be set to 100. At step 2108, the data structure 402 is populated with the overall similarity score.

Figure 22:
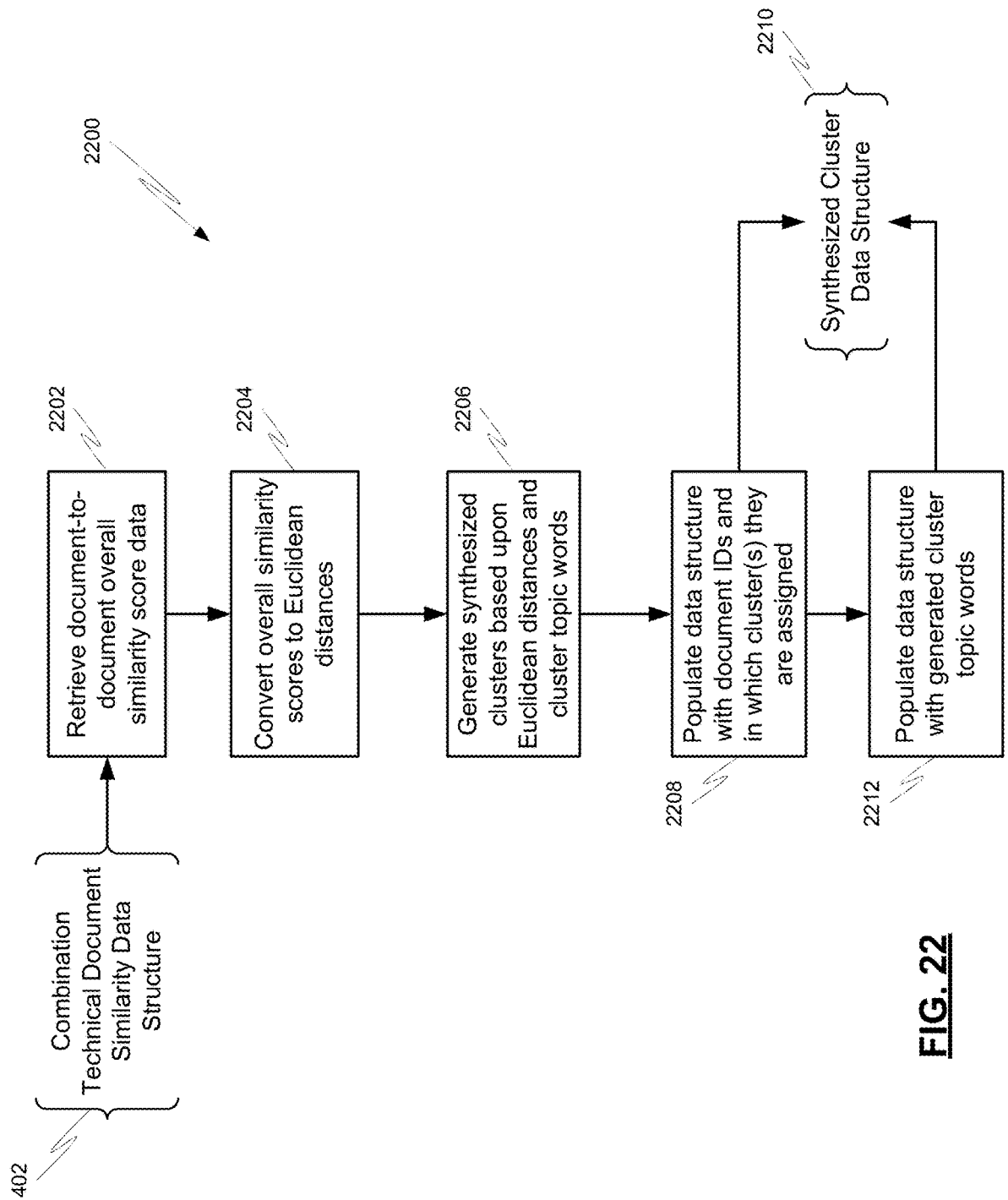

FIG. 22 depicts at 2200 generating synthesized clusters based upon the overall similarity scores to. At step 2202, document-to-document overall similarity score data is retrieved from data structure 402. An example of document-to-document overall similarity score data is shown in FIG. 23 at 2300.

With reference to FIG. 23, the first row and the first column contains document identifiers (i.e., D1, D2, etc.). Intersections between a column document identifier and a row document identifier contain the overall similarity scores between documents. For example, cell 2302 contains the overall similarity score for the document combination "D1-D2." The overall similarity score for this combination is relatively low (i.e., 4). Accordingly, the two documents are quite dissimilar and should be placed in different clusters. Higher scoring document combinations will most likely be placed in the same cluster, such as the document combination of D1-D14 which has an overall similarity score of 78 as shown at 2304.

FIG. 23 shows documents from an input document set that are compared to each other document in the input set. It should be understood that the input documents to be analyzed can be structured in different ways. For example, multiple document sets can be compared to one another. This can occur when a company wishes to analyze its patents for degree of similarity against one or more competitors. A first set of documents can contain the company's patents. A second set of documents can contain a competitor's patents. A third set of documents can contain a different competitor's patents. Other competitor patents can be added as additional sets. Each set of documents can be compared against the other document sets in order to determine overall similarity scores between documents in the different sets.

With reference back to FIG. 22, overall similarity scores are converted at step 2204 to Euclidean distances. FIG. 24 depicts at 2400 the converted Euclidean distances for the example similarity score data provided in FIG. 23. Euclidean distances can be determined in different ways, such as subtracting the value of 100 from an overall document similarity score. In this approach, an overall document similarity score of 100 will result in a Euclidean distance of 0.

Figure 25:
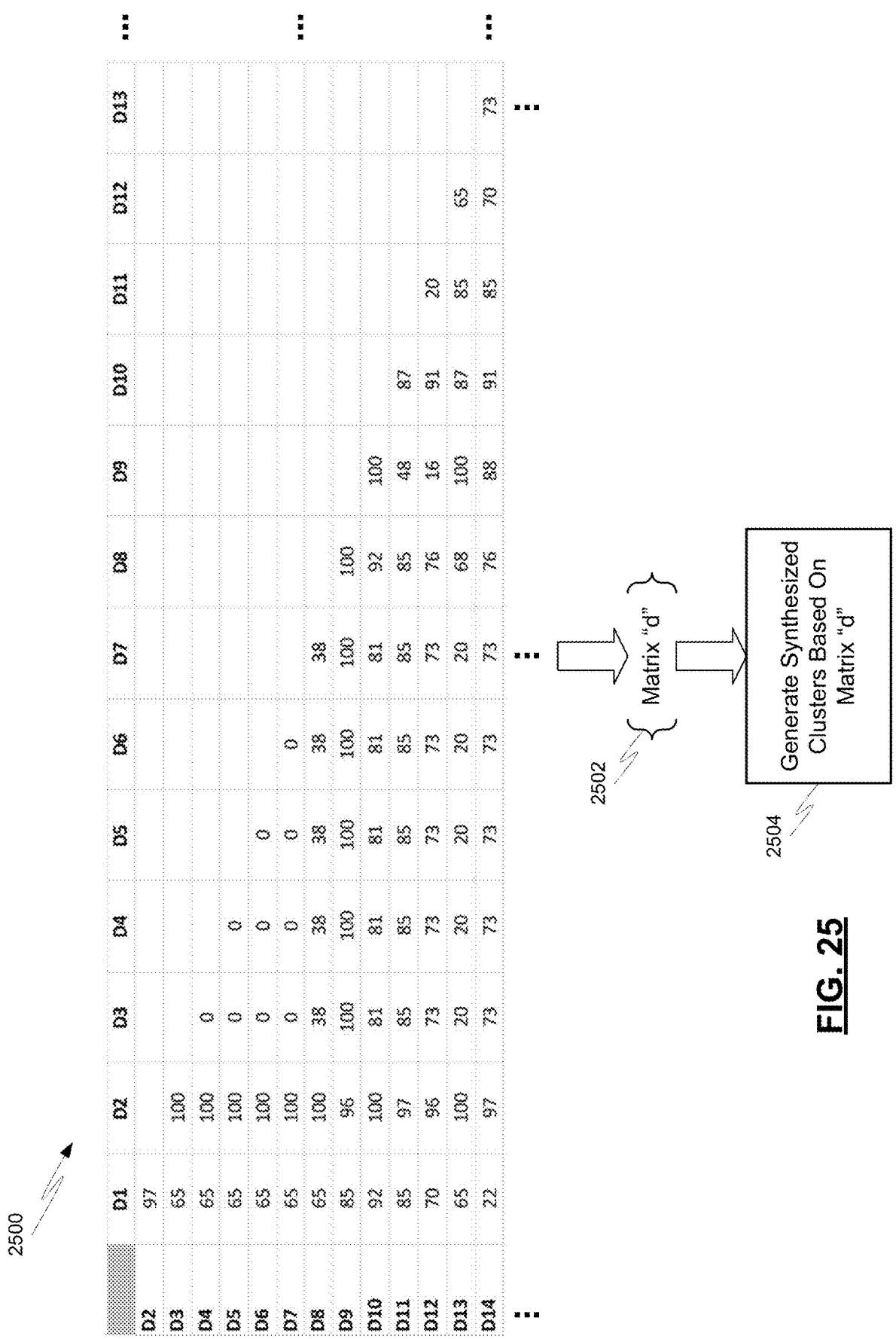

With reference back to FIG. 22, synthesized clusters are generated at step 2206 based upon the calculated Euclidean distances and cluster topic words. FIG. 25 shows transformation of the Euclidean distances into a matrix 2502 that module 2504 can use to generate the synthesized clusters. The matrix 2500 that is stored as matrix d 2502 is formed from the Euclidean distance matrix of FIG. 24 by removing the first row and removing the upper triangular matrix entries. Module 2504 can use the following python code to generate the synthesized clusters based upon matrix d: hc=hclust(d, method="complete"); plot hc. Cluster topics can be formed for each synthesized cluster by identifying the document within a cluster that has the smallest Euclidean distance to the cluster's centroid and use its title as a label for the cluster. Other python routines could be used to identify keywords for a cluster, such as the "worldcloud" routine.

With reference back to FIG. 22, step 2208 populates data structure 2210 with document IDs and the synthesized cluster(s) to which they are assigned. Step 2212 populates data structure 2210 with the generated synthesized cluster topic words.

Figure 26:
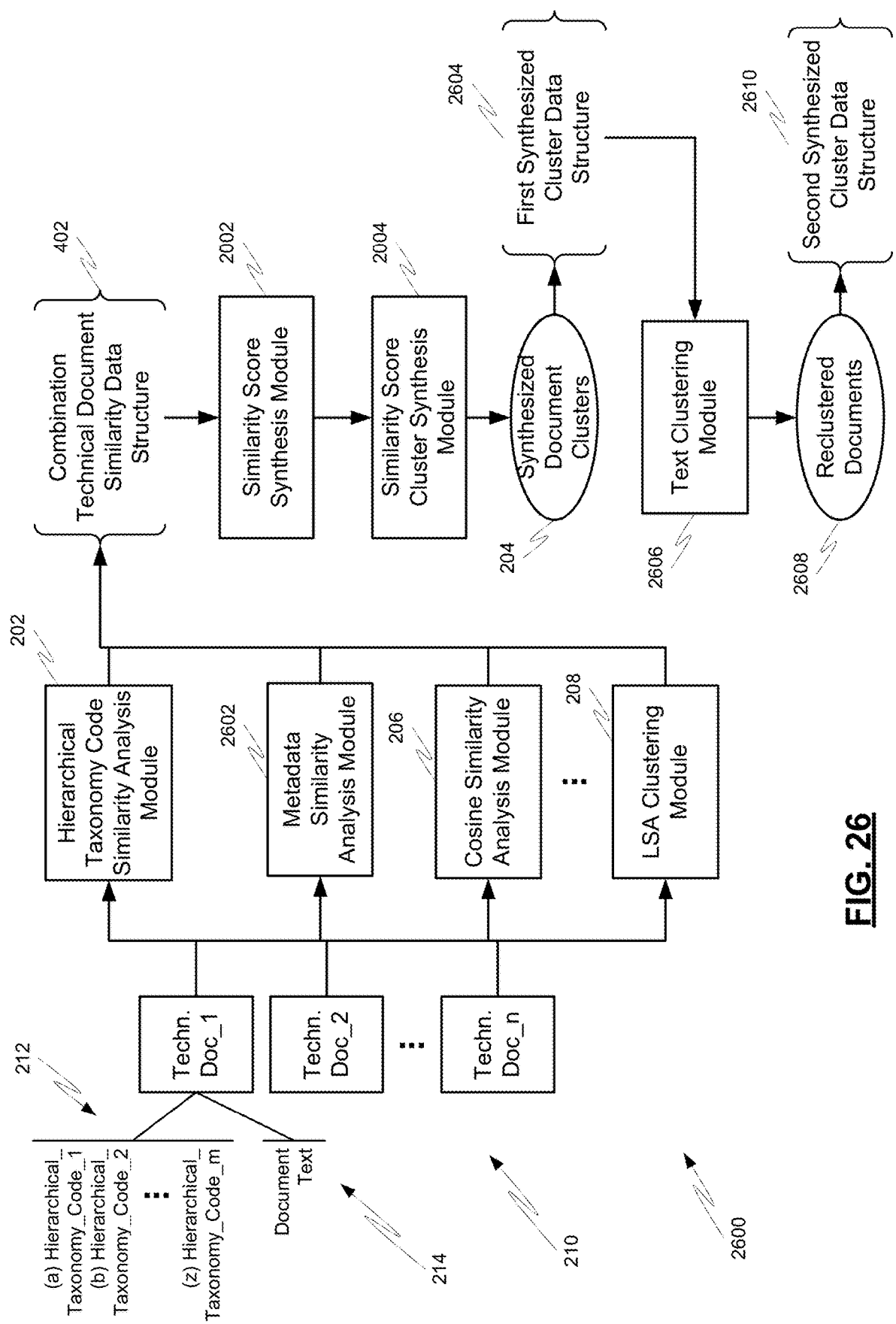
FIG. 26 is a block diagram depicting clustering in stages.

FIG. 26 depicts at 2600 that the models within the model collection can be configured in different ways. The models can be configured to operate in parallel, to operate in a serial manner, or a combination of both. For example, the models can be configured such that the text clustering 2606 is only executed after models 202, 204, 2602, and 208 have generated their similarity scores. The similarity scores from models 202, 204, 2602, and 208 are used to form top-level groups of patents. The text clustering model then clusters each of the top-level groups of patents into a finer more specific set of clusters. Clustering by the text clustering module 204 has the benefit of clustering and generating topic words for documents that have already been determined to be similar at least at a top-level.

Figure 27:
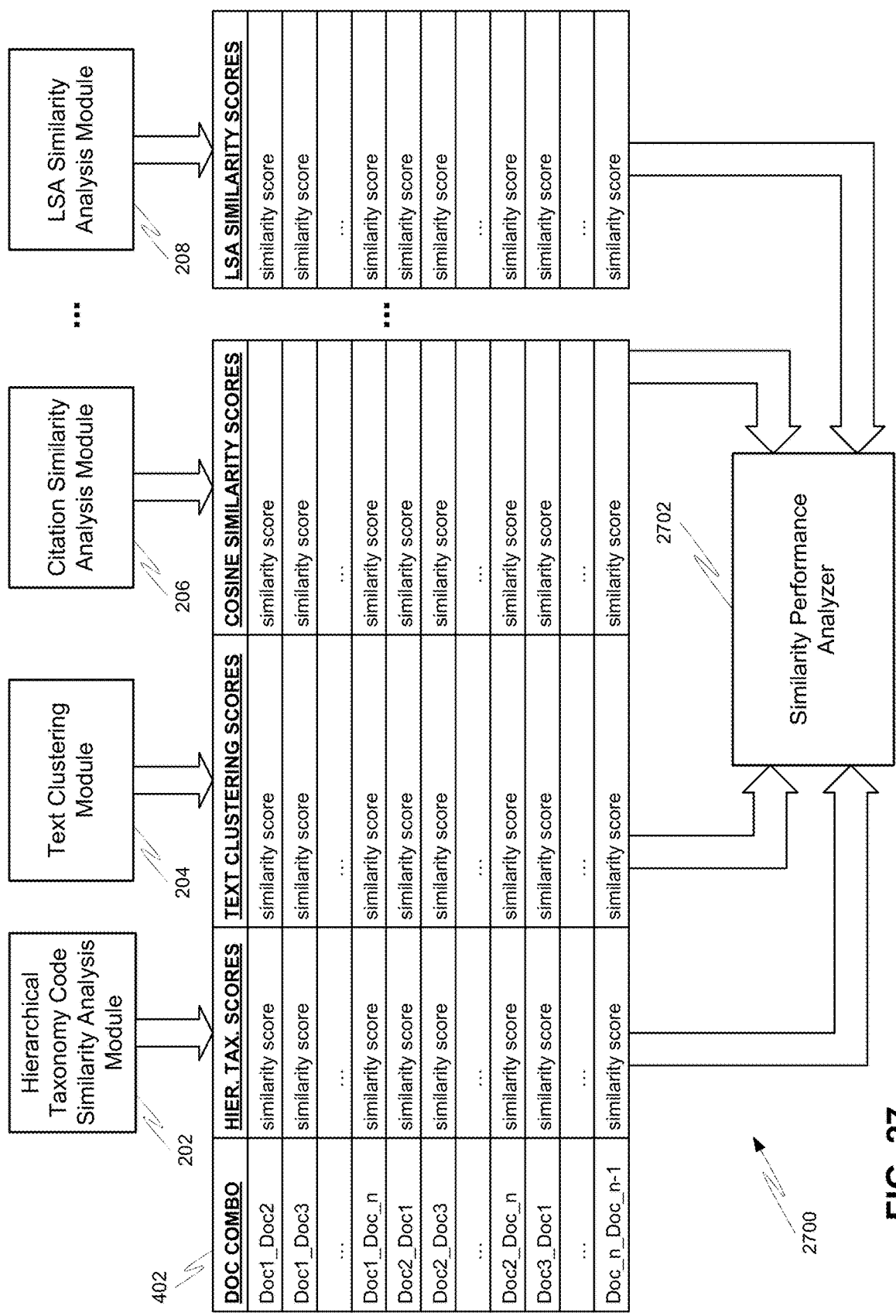
FIG. 27 is a block diagram depicting model performance analysis.

FIG. 27 depicts at 2700 a data quality checking process for evaluating model performance in determining document similarity scores. A similarity performance analyzer 2702 compares the similarity scores generated by the different models for discrepancies. For example, if a particular document combination received a very high similarity score because the documents are from the same patent family, then the other document similarity scores will be examined to check whether they also indicate that the documents are related. If any models have low similarity scores for this document combination, then a data quality flag is set for this model. Model performance evaluation can use other techniques, such as described above with respect to text clustering model performance (e.g., see I. Sharma et al., "Document Clustering: How to Measure Quality of Clusters in Absence of Ground Truth," IJCST Vol. 9, Issue 2, April-June 2018, etc.).

Figure 28:
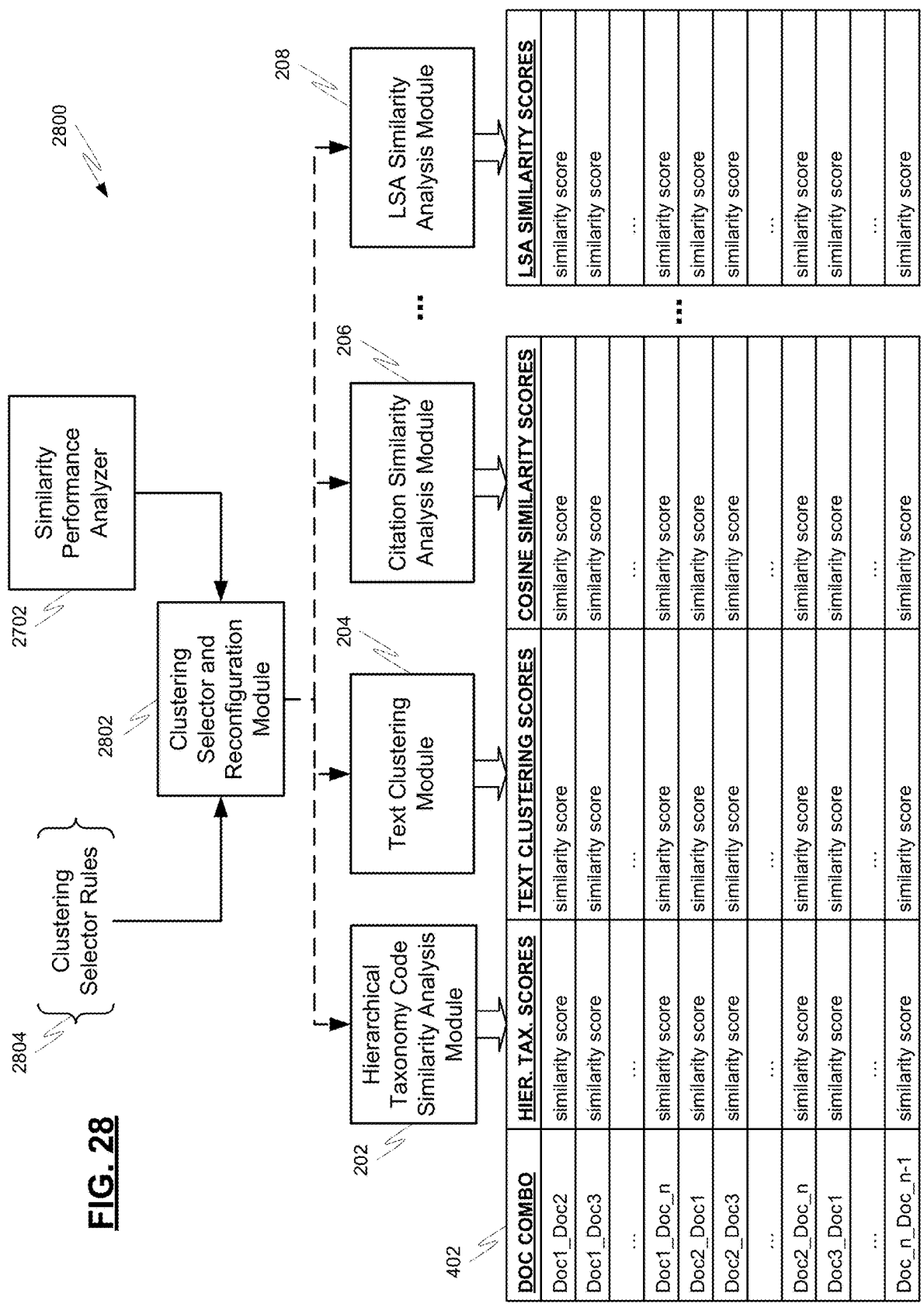
FIG. 28 is a block diagram depicting model reconfiguration operations.

FIG. 28 depicts at 2800 use of similarity performance results from the analyzer 2702 to determine which clustering and document similarity modules should be used. Clustering selector rules 2804 may assist module 2802 to determine which underperforming models should be used or their similarity scores' impact on the overall similarity score be reduced. For example, clustering selector rules can indicate that if the documents relate to a specific chemistry field, then text clustering should not be used or its document similarity scores should not be heavily weighted in determining overall document similarity scores. Performance analysis from the analyzer 2702 may supplement how module 2802 reconfigures the model collection such as to remove from consideration any underperforming model's similarity scores when determining overall similarity scores. Such a situation could also include dynamically reconfigure the models such that the similarity scores from well-performing models be used to form initial clusters for the under-performing models to form document clusters.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Details of the exemplary embodiments or other limitations described above should not be read into the claims absent a clear intention to the contrary. Any implementation described herein as exemplary is not necessarily to be construed as preferred or advantageous over other implementations, and the exemplary embodiments described herein are not intended to limit the scope or applicability of the subject matter in any way. Accordingly, it should be appreciated that the exemplary embodiment or embodiments described herein are not intended to limit the scope, applicability, or configuration of the claimed subject matter in any way. Rather, the foregoing detailed description will provide those with ordinary skill in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

For example, most clustering tools only use a textual clustering approach to generate clusters. The problem is that the textual clustering approach is not sufficiently accurate in most situations. Text clustering accuracy has also been questioned, such as why two documents that users believe are different have been placed in the same category Additionally, transparency is lacking in many situations as to why a document has been placed in a cluster. Systems and methods can be configured as described herein to provide the desired transparency by presenting the individual model and overall similarity scores. Additionally, many different types of codes can be used as mentioned above including the Library of Congress Classification for code similarity analysis between documents, the Derwent World Patents Index (DWPI) which also indicates whether technologies are military-related, etc.

Still further, other types of taxonomies can be used in place of or to supplement a hierarchical taxonomy, such as a network taxonomy, a faceted taxonomy, etc. It should be understood that a network taxonomy typically organizes subject matter into both hierarchical and associative categories. Categories can be linked to one or more categories, and relationships among items can have different meanings too. With respect to a faceted taxonomy, such a taxonomy allows an item to be assigned to multiple taxonomies, enabling the classification to be ordered in multiple ways, rather than in a single, predetermined order. Other taxonomies can include a combination of these types of taxonomies.

It should be further understood that the systems and methods described herein can be used for the different purposes described herein, such as for patent and technology portfolio analysis where company and competitor patent portfolios are analyzed for where the portfolios are similar. For example, the synthesized clusters can be viewed on a topographical type graph display where similar documents are located within the same topographical region on the graph and possibly enclosed with a cluster boundary line(s). Peaks can be drawn on the graph that mimic mountains on a topographical map to show higher concentrations of documents are present for a cluster. A cluster can be further displayed with topic words that describe the cluster. To help with the analysis, the input patent documents can be grouped into different sets of documents where each set of documents is associated with a different organization or company. As an illustration, the first set of input patents to be analyzed and compared with the other sets of competitor patents can be owned by a particular company. The second set of input patents can be patents owned by a competitor. Additional sets can be used as input if other third party patent portfolios are to be analyzed and compared to the other sets of input patents.

Another example use of the systems and methods described herein can include supplementing keyword searching where a user conducts a document search using keyword searching upon a patent database and/or a journal article database. The hierarchical taxonomy code similarity analysis module can then perform similarity analysis among the document search results so that the user can review more similar documents together. Additional similarity or text clustering analysis can be performed to determine overall document similarity scores as described herein. Such approaches provide a user with easier review of document search results. The document similarity results can be provided to another computer system to perform additional data analytics upon other aspects of the documents.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

What is claimed:

1. A processor-implemented method for restructuring clusters of technical documents that are directed to specific technical areas, comprising:

receiving, by one or more data processors, the technical documents which are associated with multiple taxonomy codes for describing different technical subject matter areas of the technical documents, wherein the taxonomy codes are associated with a hierarchical technical subject matter taxonomy which establishes a network of parent-child technical subject matter code relationships for describing technical subject matter at different levels of detail;

determining, by the one or more data processors, degrees of similarity among the technical subject matter areas of the technical documents through a hierarchical taxonomy code similarity model and a text clustering model;

wherein the hierarchical taxonomy code similarity model determines the degrees of similarity among the technical documents' hierarchical taxonomy codes based upon the technical documents' network of parent-child subject matter code relationships within the hierarchical technical subject matter taxonomy;

wherein the text clustering model determines the degrees of similarity among the technical documents by generating a first set of clusters that cluster together the technical documents of similar technical subject matter areas, and restructuring, by the one or more data processors, at least a portion of the first set of clusters of the technical documents into a second set of clusters based upon the degrees of similarity from the hierarchical taxonomy code similarity model and the determined degrees of similarity from the text clustering model;

declustering the first set of clusters to create a data set where each technical document in a cluster is separately paired with all other technical documents in the cluster and determining a text clustering document-to-document similarity score for the separately paired documents; and determining overall document similarity scores based both upon the determined similarity scores for the declustered first set of clusters and upon the determined degrees of similarity using the hierarchical taxonomy code similarity model.

2. The method of claim 1, wherein the determined overall document similarity scores, the determined similarity scores for the declustered first set of clusters, and the determined degrees of similarity using the hierarchical taxonomy code similarity model each range from 0-100 to indicate document similarity.

3. The method of claim 2, wherein the second set of clusters are synthesized clusters that are generated based upon the determined overall document similarity scores.

4. The method of claim 1, wherein the determining the degrees of similarity among the technical subject matter areas of the technical documents includes determining the degrees of similarity through the hierarchical taxonomy code similarity model and the text clustering model and a cosine similarity model and a metadata similarity analysis model;

wherein overall document similarity scores are generated based upon document similarity analysis performed by the hierarchical taxonomy code similarity model and the text clustering model and the cosine similarity model and the metadata similarity analysis model.

5. The method of claim 4, wherein document similarity analysis models include the hierarchical taxonomy code similarity model and the text clustering model and the cosine similarity model and the metadata similarity analysis model;

wherein performances of each of the document similarity analysis models are analyzed for reconfiguring process flow of the document similarity analysis models used in the document similarity analysis.

6. The method of claim 1, wherein the text clustering model determines the degrees of similarity based upon separately performing text clustering of the technical documents' textual content and text clustering of descriptive code text associated with the technical documents' hierarchical taxonomy codes.

7. The method of claim 1, wherein the received technical documents are grouped into different sets of documents for document similarity analysis, wherein each set of documents is associated with a different organization.

8. A system for restructuring clusters of technical documents that are directed to specific technical areas, the system comprising:

one or more data processors; and a memory storage device comprising executable instructions configurable to cause the one or more data processors to perform operations comprising:

receiving the technical documents which are associated with multiple taxonomy codes for describing different technical subject matter areas of the technical documents, wherein the taxonomy codes are associated with a hierarchical technical subject matter taxonomy which establishes a network of parent-child technical subject matter code relationships for describing technical subject matter at different levels of detail;

determining degrees of similarity among the technical subject matter areas of the technical documents through a hierarchical taxonomy code similarity model and a text clustering model;

wherein the hierarchical taxonomy code similarity model determines the degrees of similarity among the technical documents' hierarchical taxonomy codes based upon the technical documents' network of parent-child subject matter code relationships within the hierarchical technical subject matter taxonomy;

wherein the text clustering model determines the degrees of similarity among the technical documents by generating a first set of clusters that cluster together the technical documents of similar technical subject matter areas; and restructuring at least a portion of the first set of clusters of the technical documents into a second set of clusters based upon the degrees of similarity from the hierarchical taxonomy code similarity model and the determined degrees of similarity from the text clustering model;

declustering the first set of clusters to create a data set where each technical document in a cluster is separately paired with all other technical documents in the cluster and determining a text clustering document-to-document similarity score for the separately paired documents; and determining overall document similarity scores based both upon the determined similarity scores for the declustered first set of clusters and upon the determined degrees of similarity using the hierarchical taxonomy code similarity model.

9. The system of claim 8, wherein the determined overall document similarity scores, the determined similarity scores for the declustered first set of clusters, and the determined degrees of similarity using the hierarchical taxonomy code similarity model each range from 0-100 to indicate document similarity.

10. The system of claim 9, wherein the second set of clusters are synthesized clusters that are generated based upon the determined overall document similarity scores.

11. The system of claim 8, wherein the determining the degrees of similarity among the technical subject matter areas of the technical documents includes determining the degrees of similarity through the hierarchical taxonomy code similarity model and the text clustering model and a cosine similarity model and a metadata similarity analysis model;

wherein overall document similarity scores are generated based upon document similarity analysis performed by the hierarchical taxonomy code similarity model and the text clustering model and the cosine similarity model and the metadata similarity analysis model.

12. The system of claim 11, wherein document similarity analysis models include the hierarchical taxonomy code similarity model and the text clustering model and the cosine similarity model and the metadata similarity analysis model;

wherein performances of each of the document similarity analysis models are analyzed for reconfiguring process flow of the document similarity analysis models used in the document similarity analysis.

* * * * *